United States Patent
Saltsidis et al.

(10) Patent No.: US 11,038,804 B2
(45) Date of Patent: *Jun. 15, 2021

(54) METHOD AND SYSTEM OF IMPLEMENTING CONVERSATION-SENSITIVE COLLECTION FOR A LINK AGGREGATION GROUP

(71) Applicant: Telefonaktiebolaget L M Ericsson (publ), Stockholm (SE)

(72) Inventors: Panagiotis Saltsidis, Stockholm (SE); Janos Farkas, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,416

(22) Filed: Sep. 16, 2016

(65) Prior Publication Data

US 2017/0026299 A1 Jan. 26, 2017

Related U.S. Application Data

(63) Continuation of application No. 14/134,966, filed on Dec. 19, 2013, now Pat. No. 9,497,132.

(Continued)

(51) Int. Cl.
*H04L 12/801* (2013.01)
*H04L 12/823* (2013.01)
*H04L 12/709* (2013.01)

(52) U.S. Cl.
CPC ............ *H04L 47/34* (2013.01); *H04L 47/32* (2013.01); *H04L 45/245* (2013.01)

(58) Field of Classification Search
None
See application file for complete search history.

(56) References Cited

U.S. PATENT DOCUMENTS 6,178,500 B1 1/2001 Roth
6,430,183 B1 * 8/2002 Satran .................... H04L 29/06
370/349

(Continued)

FOREIGN PATENT DOCUMENTS

CN 1848768 A 10/2006
CN 1913414 A 2/2007

(Continued)

OTHER PUBLICATIONS

Decision to Grant for Japanese Application No. 2016509581, dated Nov. 14, 2016, 5 pages.

(Continued)

*Primary Examiner* — Gregory B Sefcheck
*Assistant Examiner* — Suk Jin Kang
(74) *Attorney, Agent, or Firm* — NDWE, LLP

(57) ABSTRACT

A method is executed by a network device for implementing conversation-sensitive collection for frames received on a port of a link of a link aggregation group. The network device executes an aggregator to collect the frames for aggregator clients, where each frame is associated with a service identifier and a conversation identifier. The service identifier identifies a data flow at a link level for a service. The conversation identifier identifies the data flow at a link aggregation group level, where each conversation data flow consists of an ordered sequence of frames, and where the conversation-sensitive collection maintains the ordered sequence by discarding frames of conversations not allocated to the port.

20 Claims, 13 Drawing Sheets

US 11,038,804 B2
Page 2

Related U.S. Application Data

(60) Provisional application No. 61/815,200, filed on Apr. 23, 2013, provisional application No. 61/815,203, filed on Apr. 23, 2013, provisional application No. 61/865,125, filed on Aug. 12, 2013.

(56) References Cited

U.S. PATENT DOCUMENTS

| | | |
|---|---|---|
| 6,445,715 B1 | 9/2002 | Annaamalai et al. |
| 6,553,568 B1 | 4/2003 | Fijolek et al. |
| 6,687,751 B1 | 2/2004 | Wils et al. |
| 6,910,149 B2 | 6/2005 | Perloff et al. |
| 7,602,726 B1 | 10/2009 | Sundaresan et al. |
| 7,782,856 B1* | 8/2010 | Larsen ............... H04L 12/4645 370/392 |
| 7,787,447 B1 | 8/2010 | Egan et al. |
| 7,869,432 B1* | 1/2011 | Mollyn ............... H04L 12/4625 370/221 |
| 7,983,267 B2 | 7/2011 | Takase et al. |
| 8,054,830 B2 | 11/2011 | Jain et al. |
| 8,151,339 B2 | 4/2012 | Ramachandran et al. |
| 8,243,594 B1* | 8/2012 | Fotedar ............... H04L 45/245 370/229 |
| 8,422,485 B2 | 4/2013 | Jung et al. |
| 8,472,312 B1 | 6/2013 | Yang et al. |
| 8,750,122 B1* | 6/2014 | Assarpour ............ H04L 12/462 370/235 |
| 8,958,337 B1* | 2/2015 | Ramanathan ......... H04L 45/245 370/254 |
| 9,143,439 B2 | 9/2015 | Wang et al. |
| 9,264,298 B2 | 2/2016 | Geroe et al. |
| 9,461,880 B2 | 10/2016 | Saltsidis et al. |
| 9,497,074 B2 | 11/2016 | Saltsidis et al. |
| 9,813,290 B2 | 11/2017 | Saltsidis et al. |
| 2002/0040389 A1 | 4/2002 | Gerba et al. |
| 2006/0022704 A1 | 2/2006 | Leijten-Nowak |
| 2006/0058059 A1 | 3/2006 | Kim |
| 2006/0159268 A1 | 7/2006 | Jung et al. |
| 2006/0227704 A1* | 10/2006 | Nakagawa ............ H04L 45/00 370/217 |
| 2006/0227711 A1* | 10/2006 | Nakagawa .......... H04L 41/0896 370/235 |
| 2006/0251106 A1* | 11/2006 | Nakagawa ............ H04L 47/41 370/456 |
| 2007/0121580 A1* | 5/2007 | Forte ............... H04L 29/06027 370/351 |
| 2007/0127464 A1 | 6/2007 | Jain et al. |
| 2007/0150614 A1* | 6/2007 | Ramachandran ....... H04L 45/00 709/238 |
| 2007/0280258 A1* | 12/2007 | Rajagopalan ......... H04L 45/245 370/395.3 |
| 2008/0155112 A1 | 6/2008 | Ma et al. |
| 2008/0219185 A1 | 9/2008 | Zou et al. |
| 2008/0291919 A1* | 11/2008 | Dunbar ............... H04L 47/745 370/395.3 |
| 2009/0073873 A1 | 3/2009 | MacAdam et al. |
| 2009/0135838 A1* | 5/2009 | Rouyer ............... H04L 12/4625 370/401 |
| 2009/0225752 A1 | 9/2009 | Mitsumori |
| 2009/0252170 A1* | 10/2009 | Hu .................. H04L 49/354 370/395.53 |
| 2010/0182920 A1* | 7/2010 | Matsuoka ............. H04L 43/00 370/252 |
| 2011/0075559 A1* | 3/2011 | Katsura ............... H04L 47/10 370/231 |
| 2011/0167101 A1 | 7/2011 | Hopen et al. |
| 2011/0194404 A1 | 8/2011 | Kluger et al. |
| 2011/0200046 A1* | 8/2011 | Kojima ............... H04L 49/351 370/392 |
| 2011/0211585 A1 | 9/2011 | Kodaka et al. |
| 2011/0299551 A1* | 12/2011 | Fiorone ............... H04L 45/36 370/401 |
| 2012/0027017 A1* | 2/2012 | Rai ................. H04L 12/18 370/392 |
| 2012/0039338 A1* | 2/2012 | Morimoto ............ H04L 47/125 370/392 |
| 2012/0233492 A1* | 9/2012 | Finn ................. H04L 45/586 714/4.1 |
| 2012/0236859 A1* | 9/2012 | Subramanian ........ H04L 45/245 370/392 |
| 2012/0275297 A1* | 11/2012 | Subramanian ........ H04L 45/245 370/225 |
| 2013/0003549 A1* | 1/2013 | Matthews ........... H04L 41/0668 370/235 |
| 2013/0022044 A1* | 1/2013 | Tatsumi ................ H04L 49/15 370/389 |
| 2013/0028072 A1* | 1/2013 | Addanki ............. H04L 41/0659 370/218 |
| 2013/0107883 A1* | 5/2013 | Ashwood-Smith ........ H04L 45/745 370/390 |
| 2013/0194914 A1* | 8/2013 | Agarwal ............. H04L 45/245 370/225 |
| 2013/0201822 A1 | 8/2013 | Liang |
| 2013/0258838 A1* | 10/2013 | Colven ................ H04L 49/552 370/218 |
| 2013/0287038 A1 | 10/2013 | Zhou et al. |
| 2013/0301427 A1* | 11/2013 | Tsai ................. H04L 45/245 370/252 |
| 2013/0308455 A1* | 11/2013 | Kapadia ............. H04L 47/2483 370/235 |
| 2014/0025736 A1 | 1/2014 | Wang et al. |
| 2014/0064056 A1* | 3/2014 | Sakata ................ H04L 41/00 370/216 |
| 2014/0089492 A1 | 3/2014 | Nelson et al. |
| 2014/0112191 A1* | 4/2014 | Farkas ............... H04L 45/245 370/254 |
| 2014/0115189 A1* | 4/2014 | Ao ................. G06F 15/161 709/250 |
| 2014/0169271 A1* | 6/2014 | Awano ................ H04W 8/12 370/328 |
| 2014/0226457 A1 | 8/2014 | Hsueh et al. |
| 2014/0281669 A1 | 9/2014 | Decusatis et al. |
| 2014/0313932 A1 | 10/2014 | Saltsidis |
| 2014/0313938 A1 | 10/2014 | Saltsidis |
| 2014/0313939 A1 | 10/2014 | Saltsidis |
| 2014/0314094 A1 | 10/2014 | Saltsidis et al. |
| 2014/0314095 A1 | 10/2014 | Saltsidis et al. |
| 2014/0314097 A1 | 10/2014 | Saltsidis |
| 2014/0317250 A1 | 10/2014 | Saltsidis |
| 2014/0321268 A1 | 10/2014 | Saltsidis |
| 2014/0347994 A1* | 11/2014 | Kapadia ............. H04L 43/0882 370/235 |
| 2014/0362736 A1* | 12/2014 | Ramanathan ......... H04L 45/245 370/254 |
| 2015/0003459 A1* | 1/2015 | Narasimhan .......... H04L 45/245 370/392 |
| 2015/0023351 A1* | 1/2015 | Rajagopalan ......... H04L 45/245 370/392 |
| 2015/0055476 A1* | 2/2015 | DeCusatis ............ H04L 47/11 370/235 |
| 2015/0124837 A1 | 5/2015 | Saltsidis et al. |
| 2015/0271068 A1 | 9/2015 | Wei et al. |
| 2015/0271086 A1 | 9/2015 | Hellhake et al. |
| 2015/0271088 A1* | 9/2015 | Ao ................. H04L 5/14 370/276 |
| 2016/0065407 A1 | 3/2016 | Saltsidis |
| 2017/0063726 A1 | 3/2017 | Saltsidis |
| 2017/0111219 A1 | 4/2017 | Saltsidis |
| 2017/0126501 A1 | 5/2017 | Saltsidis |
| 2017/0141956 A1 | 5/2017 | Saltsidis |
| 2017/0142003 A1 | 5/2017 | Saltsidis et al. |
| 2017/0188288 A1* | 6/2017 | Dinan ................ H04L 45/50 |
| 2018/0310220 A1* | 10/2018 | Dinan ................ H04L 45/50 |

FOREIGN PATENT DOCUMENTS

| CN | 1996925 A | 7/2007 |
|---|---|---|
| CN | 101094157 A | 12/2007 |
| CN | 101674208 A | 3/2010 |
| CN | 101984606 A | 3/2011 |

(56) References Cited

FOREIGN PATENT DOCUMENTS

| | | |
|---|---|---|
| CN | 102412979 A | 4/2012 |
| CN | 102647355 A | 8/2012 |
| CN | 102752187 A | 10/2012 |
| CN | 103023686 A | 4/2013 |
| CN | 103731285 A | 4/2014 |
| CN | 104125088 A | 10/2014 |
| EP | 2701342 A1 | 2/2014 |
| JP | 2011508501 A | 3/2011 |
| KR | 10-1000699 B1 | 12/2010 |
| RU | 2313912 C2 | 12/2007 |
| RU | 2472316 C1 | 1/2013 |
| RU | 2475988 C2 | 2/2013 |
| TW | 200523798 A | 7/2005 |
| WO | 2009154869 A2 | 12/2009 |
| WO | 2010124628 A1 | 11/2010 |
| WO | 2011083668 A1 | 7/2011 |
| WO | 2012018521 A1 | 2/2012 |
| WO | 2012022714 A1 | 2/2012 |
| WO | WO-2012065336 A1 | 5/2012 |
| WO | WO-2012142910 A1 | 10/2012 |
| WO | WO-2013127416 A1 | 9/2013 |
| WO | WO-2013171552 A1 | 11/2013 |
| WO | 2014059844 A1 | 4/2014 |

OTHER PUBLICATIONS

Decision to Grant for Japanese Application No. JP2016509579, dated Nov. 30, 2016, 6 pages.

Non-Final Office Action from U.S. Appl. No. 14/257,871, dated Nov. 3, 2016, 25 pages.

Notice of Allowance from Korean Application No. KR20157033235, dated Nov. 16, 2016, 3 pages.

Office Action from Australian Application No. 2014259015, dated Oct. 7, 2016, 3 pages.

International Search Report and Written Opinion, Application No. PCT/IB2014/060912, dated Aug. 28, 2014, 13 pages.

Written Opinion of the International Preliminary Examining Authority, Application No. PCT/IB2014/060912, dated Mar. 30, 2015, 8 pages.

International Preliminary Report on Patentablility, Application No. PCT/IB2014/060912, dated Aug. 7, 2015, 64 pages.

International Search Report and Written Opinion, Application No. PCT/IB2014/060913, dated Aug. 27, 2014, 14 pages.

Written Opinion of the International Preliminary Examining Authority, Application No. PCT/IB2014/060913, dated Apr. 2, 2015, 10 pages.

International Preliminary Report on Patentability, Application No. PCT/IB2014/060913, dated Aug. 4, 2015, 50 pages.

International Search Report and Written Opinion, Application No. PCT/IB2014/060914, dated Aug. 27, 2014, 14 pages.

Written Opinion of the International Preliminary Examining Authroity, Application No. PCT/IB2014/060914, dated Mar. 30, 2015, 10 pages.

International Preliminary Report on Patentability, Application No. PCT/IB2014/060914, dated Aug. 4, 2015, 64 pages.

International Search Report and Written Opinion, Application No. PCT/IB2014/060915, dated Jul. 30, 2014, 13 pages.

Written Opinion of the International Preliminary Examining Authority, Application No. PCT/IB2014/060915, dated Apr. 8, 2015, 8 pages.

International Preliminary Report on Patentability, Application No. PCT/IB2014/060915, dated Jul. 30, 2015, 66 pages.

International Search Report and Written Opinion, Application No. PCT/IB2014/060916, dated Jul. 31, 2014, 14 pages.

Written Opinion of the International Preliminary Examining Authority, Application No. PCT/IB2014/060916, dated Apr. 1, 2015, 8 pages.

International Preliminary Report on Patentability, Application No. PCT/IB2014/060916, dated Aug. 4, 2015, 64 pages.

International Search Report and Written Opinion, Application No. PCT/IB2014/060917, dated Jul. 22, 2014, 14 pages.

Written Opinion of the International Preliminary Examining Authroity, Application No. PCT/IB2014/060917, dated Apr. 8, 2015, 11 pages.

International Preliminary Report on Patentability, Application No. PCT/IB2014/060917, dated Aug. 4, 2015, 70 pages.

International Search Report and Written Opinion, Application No. PCT/SE2014/050282, dated Jul. 29, 2014, 11 pages.

Written Opinion of the International Preliminary Examining Authority, Application No. PCT/SE2014/050282, dated May 6, 2015, 5 pages.

International Preliminary Report on Patentability, Application No. PCT/SE2014/050282, dated Jul. 27, 2015, 23 pages.

International Search Report, Application No. PCT/SE2014/050177, dated Jul. 15, 2014, 4 pages.

Written Opinion, Application No. PCT/SE2014/050177, dated Jul. 15, 2014, 8 pages.

International Search Report, Application No. PCT/SE2014/050283, dated Jul. 21, 2014, 3 pages.

Written Opinion, Application No. PCT/SE2014/050283, dated Jul. 21, 2014, 6 pages.

Written Opinion of the International Preliminary Examining Authority, Application No. PCT/SE2014/050283, dated Mar. 23, 2015, 7 pages.

International Preliminary Report on Patentability, Application No. PCT/SE2014/050283, dated Jul. 1, 2015, 8 pages.

Non-Final Office Action, U.S. Appl. No. 14/134,966, dated Jun. 17, 2015, 17 pages.

Non-Final Office Action, U.S. Appl. No. 14/135,556, dated Nov. 6, 2015, 34 pages.

IEEE 802.1AC-2012, "Media Access Control (MAC) Service Definition," Standard for Local and metropolitan area networks, Institute of Electrical and Electronics Engineers, Inc. (IEEE), Sep. 14, 2012, 43 pages.

IEEE 802.1ad-2005, "Virtual Bridged Local Area Networks, Amendment 4: Provider Bridges," Standard for Local and metropolitan area networks, Institute of Electrical and Electronics Engineers, Inc. (IEEE), May 26, 2006, 74 pages.

IEEE 802.1ah-2008, "Virtual Bridged Local Area Networks, Amendment 7: Provider Backbone Bridges," Standard for Local and Metropolitan Area Networks, Institute of Electrical and Electronics Engineers, Inc. (IEEE), Aug. 14, 2008, 121 pages.

IEEE P802.1aq/D2.1, "Virtual Bridged Local Area Networks, Amendment 9: Shortest Path Bridging," Draft Standard for Local and Metropolitan Area Networks, Institute of Electrical and Electronics Engineers, Inc. (IEEE), Aug. 21, 2009, 208 pages.

IEEE 802.1aq-2012, "Media Access Control (MAC) Bridges and Virtual Bridged Local Area Networks, Amendment 20: Shortest Path Bridging," Institute of Electrical and Electronics Engineers, Inc. (IEEE), Jun. 29, 2012, 340 pages.

IEEE 802.1AX-2008, "Link Aggregation," Standard for Local and Metropolitan Area Networks, Institute of Electrical and Electronics Engineers, Inc. (IEEE), Nov. 3, 2008, 162 pages.

IEEE P802.1AX-REV/D0.5, "Link Aggregation," Draft Standard for Local and Metropolitan Area Networks, Institute of Electrical and Electronics Engineers, Inc. (IEEE), Jan. 13, 2013, 190 pages.

IEEE P802.1AX-REV/D1.0, Link Aggregation, Draft Standard for Local and Metropolitan Area Networks, Institute of Electrical and Electronics Engineers, Inc. (IEEE), Feb. 1, 2013, 190 pages.

IEEE P802.1AX-REV/D3.0, "Link Aggregation," Draft Standard for Local and Metropolitan Area Networks, Institute of Electrical and Electronics Engineers, Inc. (IEEE), Sep. 24, 2013, 312 pages.

IEEE P802.1AX-REV-D3.1, "Link Aggregation," Draft Standard for Local and Metropolitan Area Networks, Institute of Electrical and Electronics Engineers, Inc. (IEEE), Dec. 20, 2013, 317 pages.

IEEE P802.1AX-REV-D4.3, "Link Aggregation," Draft Standard for Local and Metropolitan Area Networks, Institute of Electrical and Electronics Engineers, Inc. (IEEE), Jul. 21, 2014, 320 pages.

IEEE P802.1AX-REV-D4.4b, "Link Aggregation," Draft Standard for Local and Metropolitan Area Networks, Institute of Electrical and Electronics Engineers, Inc. (IEEE), Aug. 31, 2014, 329 pages.

(56) References Cited

OTHER PUBLICATIONS

IEEE 802.1Q-2011, "Media Access Control (MAC) Bridges and Virtual Bridged Local Area Networks," Institute of Electrical and Electronics Engineers, Inc. (IEEE), Aug. 31, 2011, 1365 pages.
IEEE P802.1Q-REV/D1.0, "Media Access Control (MAC) Bridges and Virtual Bridged Local Area Networks," Draft Standard, Institute of Electrical and Electronics Engineers, Inc. (IEEE), Apr. 23, 2013, 1791 pages.
IEEE 802.11, "Part 11: Wireless LAN Medium Access Control (MAC) and Physical Layer (PHY) Specifications," Standard, Institute of Electrical and Electronics Engineers, Inc. (IEEE), Mar. 29, 2012, 2793 pages.
IEEE 802.3-2012, "IEEE Standard for Internet," Section One, 634 pages; Section Two, 780 pages; Section Three, 358 pages; Section Four, 732 pages; Section Five, 844 pages; Section Six, 400 pages; Institute of Electrical and Electronics Engineers, Inc.; Dec. 28, 2012.
ITU-T, G.870/Y.1352: Digital networks, Optical transport networks, Series Y: Global Information Infrastructure, Internet Protocol Aspects and Next-Generation Networks, Series G: Transmission Systems and Media, Digital Systems and Networks, Oct. 2012, 30 pages.
RFC: 768: Postel, "User Datagram Protocol," Network Working Group, Request for Comments, Aug. 28, 1980, 3 pages.
RFC 793: "Transmission Control Protocol, DARPA Internet Program Protocol Specification," Network Working Group, Request for Comments, Sep. 1981, 91 pages.
RFC 1058: Hedrick, "Routing Information Protocol," Network Working Group, Request for Comments, Jun. 1988, 33 pages.
RFC 1142: Oran, "Osi Is-Is Intra-domain Routing Protocol," Network Working Group, Request for Comments, Feb. 1990, 157 pages.
RFC 1180: Socolofsky, et al., "A TCP/IP Tutorial," Network Working Group, Request for Comments, Jan. 1991, 28 pages.
RFC 1321: Rivest, "The MD5 Message-Digest Algorithm," Network Working Group, Request for Comments, Apr. 1992, 20 pages.
RFC 2080: Malkin, et al., "RIPng for IPv6," Network Working Group, Request for Comments, Jan. 1997, 19 pages.
RFC 2205: Braden, et al., "Resource ReSerVation Protocol (RSVP)—Version 1 Functional Specification," Network Working Group, Request for Comments, Sep. 1997, 112 pages.
RFC 2210: Wroclawski, "The Use of RSVP with IETF Integrated Services," Network Working Group, Request for Comments, Sep. 1997, 33 pages.
RFC 2211: Wroclawski, "Specification of the Controlled-Load Network Element Service," Network Working Group, Request for Comments, Sep. 1997, 19 pages.
RFC 2212: Shenker, et al., "Specification of Guaranteed Quality of Service," Network Working Group, Request for Comments, Sep. 1997, 20 pages.
RFC 2328: Moy, "OSPF Version 2," Network Working Group, Request for Comments, The Internet Society, Apr. 1998, 244 pages.
RFC 2453: Malkin, "RIP Version 2," Network Working Group, Request for Comments, The Internet Society, Nov. 1998, 39 pages.
RFC 2460: Deering, et al., "Internet Protocol, Version 6 (IPv6) Specification," Network Working Group, Request for Comments, The Internet Society, Dec. 1998, 39 pages.
RFC 2474: Nichols, et al., "Definition of the Differentiated Services Field (DS Field) in the IPv4 and IPv6 Headers," Network Working Group, Request for Comments, The Internet Society, Dec. 1998, 20 pages.
RFC 2475: Blake, et al., "An Architecture for Differentiated Services," Network Working Group, Request for Comments, The Internet Society, Dec. 1998, 36 pages.
RFC 2597: Heinanen, et al., "Assured Forwarding PHB Group," Network Working Group, Request for Comments, The Internet Society, Jun. 1999, 11 pages.
RFC 2675: Borman, et al., "IPv6 Jumbograms," Network Working Group, Request for Comments, The Internet Society, Aug. 1999, 9 pages.
RFC 2983: Black, "Differentiated Services and Tunnels," Network Working Group, Request for Comments, The Internet Society, Oct. 2000, 14 pages.
RFC 3086: Nichols, et al., "Definition of Differentiated Services Per Domain Behaviors and Rules for their Specification," Network Working Group, Request for Comments, The Internet Society, Apr. 2001, 24 pages.
RFC 3140: Black, et al., "Per Hop Behavior Identification Codes," Network Working Group, Request for Comments, The Internet Society, Jun. 2001, 8 pages.
RFC 3209: Awduche, et al., "RSVP-TE: Extensions to RSVP for LSP Tunnels," Network Working Group, Request for Comments, The Internet Society, Dec. 2001, 61 pages.
RFC 3246: Davie, et al., "An Expedited Forwarding PHB (Per-Hop Behavior)," Network Working Group, Request for Comments, The Internet Society, Mar. 2002, 16 pages.
RFC 3247: Charny, et al., "Supplemental Information for the New Definition of the EF PHB (Expedited Forwarding Per-Hop Behavior)," Network Working Group, Request for Comments, The Internet Society, Mar. 2002, 24 pages.
RFC 3260: Grossman, "New Terminology and Clarifications for Diffserv," Network Working Group, Request for Comments, The Internet Society, Apr. 2002, 10 pages.
RFC 3289: Baker, et al., "Management Information Base for the Differentiated Services Architecture," Network Working Group, Request for Comments, The Internet Society, May 2002, 116 pages.
RFC 3290: Bernet, et al., "An Informal Management Model for Diffserv Routers," Network Working Group, Request for Comments, The Internet Society, May 2002, 56 pages.
RFC 3317: Chan, et al., "Differentiated Services Quality of Service Policy Information Base," Network Working Group, Request for Comments, The Internet Society, Mar. 2003, 96 pages.
RFC 3473: Berger, "Generalized Multi-Protocol Label Switching (GMPLS) Signaling Resource ReserVation Protocol-Traffic Engineering (RSVP-TE) Extensions," Network Working Group, Request for Comments, The Internet Society, Jan. 2003, 42 pages.
RFC 3936: Kompella, et al., "Procedures for Modifying the Resource reSerVation Protocol (RSVP)," Network Working Group, Request for Comments, The Internet Society, Oct. 2004, 7 pages.
RFC 4113: Fenner, et al., "Management Information Base for the User Datagram Protocol (UDP)," Network Working Group, Request for Comments, The Internet Society, Jun. 2005, 19 pages.
RFC 4271: Rekhter, et al., "A Border Gateway Protocol 4 (BGP-4)," Network Working Group, Request for Comments, The Internet Society, Jan. 2006, 104 pages.
RFC 4301: Kent, et al., "Security Architecture for the Internet Protocol," Network Working Group, Request for Comments, The Internet Society, Dec. 2005, 101 pages.
RFC 4309: Housley, et al., "Using Advanced Encryption Standard (AES) CCM Mode with IPsec Encapsulating Security Payload (ESP)," Network Working Group, Request for Comments, The Internet Society, Dec. 2005, 13 pages.
RFC 4495: Polk, et al., "A Resource Reservation Protocol (RSVP) Extension for the Reduction of Bandwidth of a Reservation Flow," Network Working Group, Request for Comments, The Internet Society, May 2006, 21 pages.
RFC 4558: Ali, et al., "Node-ID Based Resource Reservation Protocol (RSVP) Hello: A Clarification Statement," Network Working Group, Request for Comments, The Internet Society, Jun. 2006, 7 pages.
RFC 4594: Babiarz, et al., "Configuration Guidelines for DiffServ Service Classes," Network Working Group, Request for Comments, The Internet Society, Aug. 2006, 57 pages.
RFC 4761: Kompella, et al., "Virtual Private LAN Service (VPLS) Using BGP for Auto-Discovery and Signaling," Network Working Group, Request for Comments, The IETF Trust, Jan. 2007, 28 pages.
RFC 4762: Lasserre, et al., "Virtual Private LAN Service (VPLS) Using Label Distribution Protocol (LDP) Signaling," Network Working Group, Request for Comments, The IETF Trust, Jan. 2007, 31 pages.

(56) References Cited

OTHER PUBLICATIONS

RFC 5036: Andersson, et al., "LDP Specification," Network Working Group, Request for Comments, The IETF Trust, Oct. 2007, 135 pages.
RFC 5340: Coltun, et al., "OSPF for IPv6," Network Working Group, Request for Comments, The IETF Trust, Jul. 2008, 94 pages.
RFC 5405: Eggert, et al., "Unicast UDP Usage Guidelines for Application Designers," Network Working Group, Request for Comments, IETF Trust and the persons identified as the document authors, Nov. 2008, 27 pages.
RFC 5865: Baker, et al., "A Differentiated Services Code Point (DSCP) for Capacity-Admitted Traffic," Internet Engineering Task Force (IETF), Request for Comments, IETF Trust and the persons identified as the document authors, May 2010, 14 pages.
Ao, Ting, "Thinking on conversation-sensitive frame collection," IEEE Draft, AXREV-TINGA-LACP-EXTENSION-1112-VO, Nov. 11, 2012, pp. 1-14, vol. 802.1, No. VO, IEEE-SA.
Finn, "Diagrams to support ballots comments on 802.1AX-Rev; axrev-nfinn-DRNI-diagrams-0312-v01," IEEE Draft, AXREV-NFINN-DRNI-DIAGRAMS-0312-V01, Mar. 12, 2012, pp. 1-3, vol. 802.1, No. v01, IEEE-A, Piscataway, NJ, USA.
Haddock, IEEE Draft; "Rough Outline for a Intra-Portal Protocol Version 03," AXREV-HADDOCK-ROUGH-INTRA-PORTAL-PROTOCOL-0912-V03, Sep. 12, 2012, 12 pages, vol. 802.1, No. v03, IEEE-SA, Piscataway, NJ, USA.
Saltsidis, 802.1AX-REV—Link Aggregation Revision, Joint IEEE-SA and ITU Workshop on Ethernet, Geneva, Switzerland, Jul. 13, 2013, 17 pages.
International Search Report and Written Opinion, Application No. PCT/IB2015/056545, dated Nov. 19, 2015, 9 pages.
Non-Final Office Action, U.S. Appl. No. 14/134,966, dated Nov. 25, 2015, 18 pages.
Non-Final Office Action, U.S. Appl. No. 14/167,155, dated Dec. 4, 2015, 39 pages.
Non-Final Office Action, U.S. Appl. No. 14/257,859, dated Dec. 7, 2015, 61 pages.
Non-Final Office Action, U.S. Appl. No. 14/257,769, dated Dec. 8, 2015, 28 pages.
Non-Final Office Action, U.S. Appl. No. 14/257,360, dated Jan. 13, 2016, 59 pages.
Yuehua, Wei, "Establish/Maintain a Portal and Distributed Relay," IEEE 802 plenary, San Antonio, Nov. 2012, 9 pages.
Non-Final Office Action, U.S. Appl. No. 14/257,252, dated Feb. 2, 2016, 41 pages.
IEEE P802.1AX-REV/D0.3, "Link Aggregation," Draft Standard for Local and Metropolitan Area Networks, Institute of Electrical and Electronics Engineers, Inc. (IEEE), Sep. 9, 2012, 183 pages.
Non-Final Office Action, U.S. Appl. No. 14/257,871, dated Mar. 16, 2016, 47 pages.
Non-Final Office Action, U.S. Appl. No. 14/257,637, dated Mar. 21, 2016, 44 pages.
Communication Pursuant to Article 94(3) EPC for Application No. 14 724 800.9, dated Apr. 22, 2016, 7 pages.
Nigel Bragg; "Split Brain Detection 1; axbq-bragg-split-brain-detection-0912-v00", IEEE Draft, vol. 802.1, No. v00, Sep. 6, 2012, pp. 1-8.
Final Office Action, U.S. Appl. No. 14/257,769, dated Apr. 26, 2016, 22 pages.
Notice of Allowance, U.S. Appl. No. 14/257,252, dated May 24, 2016, 11 pages.
Final Office Action, U.S. Appl. No. 14/135,556, dated Jun. 16, 2016, 28 pages.
International Preliminary Report on Patentability (Chapter I), Application No. PCT/SE2014/050177, dated May 19, 2016, 9 pages.
Notice of Allowance, U.S. Appl. No. 14/257,360, dated Jun. 27, 2016, 26 pages.
First Written Opinion for Singapore Application No. 11201508361X, dated Jun. 29, 2016, 9 pages.

"Link Aggregation Control Protocol (LACP) (802.3ad) for Gigabit Interfaces", Cisco IOS Release 12.2(31) SB2, Mar. 1, 2007, pp. 1-18.
Notice of Allowance, U.S. Appl. No. 14/257,859, dated Jul. 11, 2016, 34 pages.
Notice of Allowance, U.S. Appl. No. 14/257,637, dated Jul. 20, 2016, 15 pages.
Final Office Action, U.S. Appl. No. 14/167,155, dated Jul. 22, 2016, 53 pages.
Notice of Allowance, U.S. Appl. No. 14/134,966, dated Jun. 17, 2016, 19 pages.
Final Office Action, U.S. Appl. No. 14/257,871, dated Aug. 16, 2016, 42 pages.
Notice of Allowance, U.S. Appl. No. 14/135,556, dated Sep. 1, 2016, 21 pages.
Decision to Grant a Patent from foreign counterpart Russian Patent Application No. 2015149749, dated Jan. 19, 2017, 33 pages.
International Preliminary Report on Patentability for Application No. PCT/IB2015/056545, dated Mar. 9, 2017, 8 pages.
Non-Final Office Action from U.S. Appl. No. 14/838,353, dated Feb. 14, 2017, 117 pages.
Notice of Allowance from U.S. Appl. No. 14/167,155 dated Jan. 13, 2017, 33 pages.
Notice of Allowance from U.S. Appl. No. 14/257,769 dated Jan. 9, 2017, 37 pages.
Notice of Allowance from U.S. Appl. No. 14/257,871, dated Feb. 23, 2017, 24 pages.
Office Action and Search Report from foreign counterpart Russian Patent Application No. 2015149846, dated Jun. 7, 2017, 11 pages.
Restriction Requirement from U.S. Appl. No. 15/265,292, dated Jun. 15, 2017, 6 pages.
Decision on Grant from foreign counterpart Russian Patent Application No. 2015149846, dated Oct. 20, 2017, 22 pages.
First Office Action and Search Report from foreign counterpart Chinese Patent Application No. 201480023115.0, dated Aug. 3, 2017, 29 pages. (Translation available only for office action).
First Office Action and Search Report from foreign counterpart Chinese Patent Application No. 201480023171.4, dated Aug. 3, 2017, 35 pages. (Translation available only for office action).
Non-Final Office Action from U.S. Appl. No. 15/265,292, dated Sep. 12, 2017, 75 pages.
Non-Final Office Action from U.S. Appl. No. 15/349,984, dated Sep. 21, 2017, 64 pages.
Notice of Allowance from U.S. Appl. No. 14/838,353, dated Jun. 26, 2017, 23 pages.
First Office Action and Search Report from foreign counterpart Chinese Patent Application No. 2014800358768, dated Jan. 22, 2018, 6 pages.
Requirement for Restriction/Election from U.S. Appl. No. 15/339,162, dated Apr. 5, 2018, 6 pages.
Requirement for Restriction/Election from U.S. Appl. No. 15/344,479, dated Apr. 3, 2018, 6 pages.
Notification to Grant Patent from foreign counterpart Chinese Patent Application No. 201480023115.0, dated Feb. 14, 2018, 3 pages.
Final Office Action from U.S. Appl. No. 15/349,984, dated Feb. 2, 2018, 10 pages.
Non-Final Office Action from U.S. Appl. No. 15/265,292, dated Feb. 5, 2018, 10 pages.
Search Report from foreign counterpart Chinese Patent Application No. 201450035870.0, dated Jan. 19, 2018, 3 pages.
Notice of Allowance from U.S. Appl. No. 15/349,984, dated May 25, 2018, 14 pages.
Notice of Reasons for Rejection from foreign counterpart Japanese Patent Application No. 2017-511729, dated Mar. 27, 2018, 2 pages. (English Translation only available).
Office Action and Search Report from foreign counterpart Taiwan Patent Application No. 103114565, dated May 11, 2018, 13 pages.
Decision to Grant a Patent from foreign counterpart Japanese Patent Application No. 2017-000284, dated Jul. 17, 2018, 6 pages.
Non-Final Office Action from U.S. Appl. No. 15/339,162, dated Jul. 19, 2018, 121 pages.

(56) References Cited

OTHER PUBLICATIONS

Non-Final Office Action from U.S. Appl. No. 15/344,479, dated Jun. 26, 2018, 124 pages.
Non-Final Office Action from U.S. Appl. No. 15/402,427, dated Aug. 10, 2018, 116 pages.
Notice of Allowance from U.S. Appl. No. 15/265,292, dated Aug. 23, 2018, 6 pages.
Notice of Allowance from U.S. Appl. No. 15/344,479, dated Oct. 19, 2018, 25 pages.
Notice of Allowance from U.S. Appl. No. 15/339,162, dated Nov. 19, 2018, 19 pages.
Notice of Allowance from U.S. Appl. No. 15/265,292, dated Jun. 22, 2018, 18 pages.
Office Action and Search Report from foreign counterpart Taiwan Patent Application No. 103114565, dated Dec. 11, 2018, 4 pages.
Extended European Search Report for Application No. 19152440.4, dated Feb. 18, 2019, 8 pages.
Non-Final Office Action from U.S. Appl. No. 15/790,870, dated Jan. 30, 2019, 79 pages.
Notice of Allowance from U.S. Appl. No. 15/344,479, dated Feb. 6, 2019, 10 pages.
Notice of Allowance from U.S. Appl. No. 15/402,427, dated Jan. 29, 2019, 12 pages.
Requirement for Restriction/Election, U.S. Appl. No. 16/294,870, dated Sep. 11, 2020, 7 pages.
Examination Report, IN App. No. 9149/DELNP/2015, dated Feb. 27, 2020, 10 pages.
Non Final Office Action, U.S. Appl. No. 16/294,870, dated Oct. 14, 2020, 15 pages.
Notice of Allowance, U.S. Appl. No. 16/294,870, dated Jan. 25, 2021, 8 pages.
Notice of Allowance, U.S. Appl. No. 16/294,870, dated May 7, 2021, 2 pages.
First Office Action, CN App. No. 201810393202.5, dated Mar. 26, 2021, 12 pages (5 pages of English Translation and 7 pages of Original Document).
First Office Action, CN App. No. 201910460594.7, dated Mar. 23, 2021, 8 pages (4 pages of English Translation and 4 pages of Original Document).
Search Report, CN App. No. 201810393202.5, dated Mar. 18, 2021, 5 pages (3 page of English Translation and 2 pages of Original Document).
Search Report, CN App. No. 201910460594.7, dated Mar. 16, 2021, 3 pages (1 page of English Translation and 2 pages of Original Document).

* cited by examiner

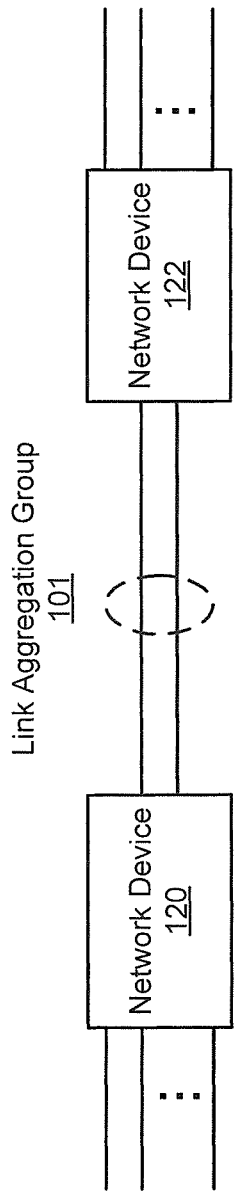
FIG. 1A --PRIOR ART--
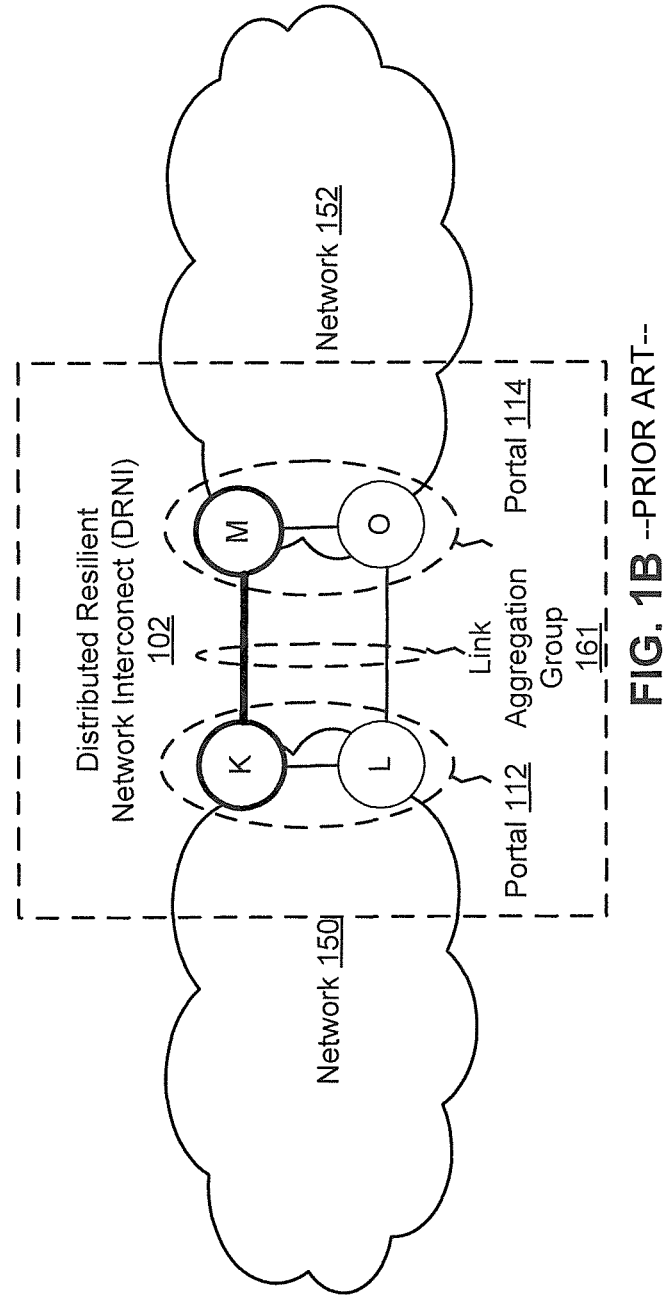
FIG. 1B --PRIOR ART--

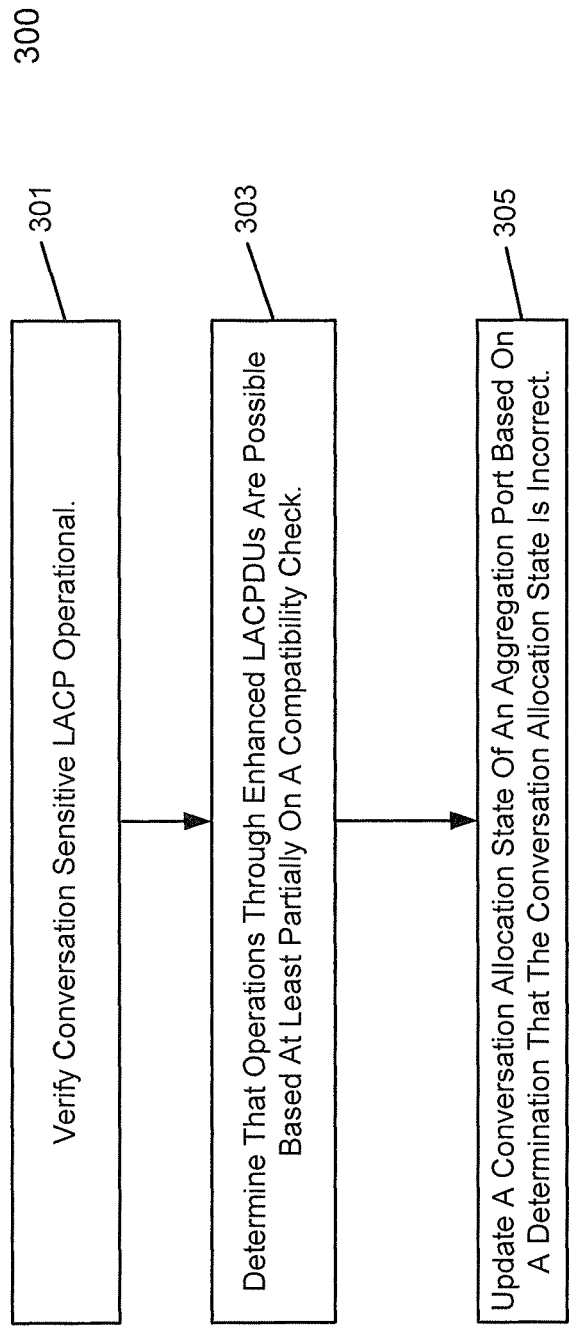

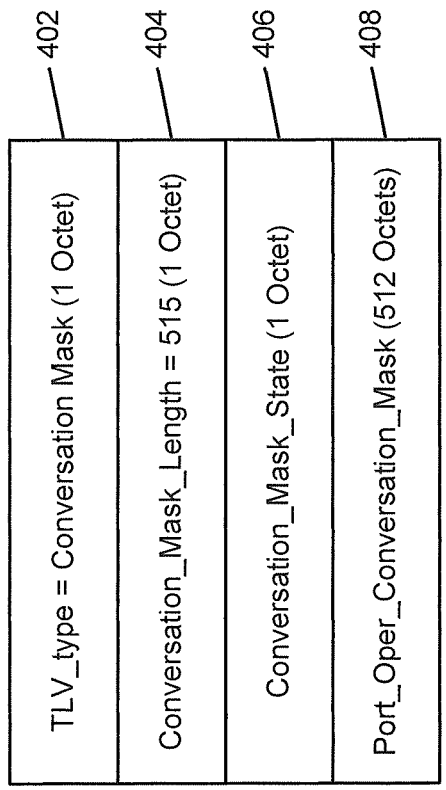

FIG. 8A

Partner Conversation Mask Variable: 01010101...00

Collection Conversation Mask: 01010101...00
Distribution Conversation Mask: 01010101...00
Conversation Mask State: 10000000

FIG. 8B

Partner Conversation Mask Variable: 11110000...00

Collection Conversation Mask: 01010101...00
Distribution Conversation Mask: 01010101...00
Conversation Mask State: 00000000

FIG. 8C

Partner Conversation Mask Variable: 11110000...00

Collection Conversation Mask: 01010000...00
Distribution Conversation Mask: 01010000...00
Conversation Mask State: 00000000

FIG. 8D

Partner Conversation Mask Variable: 11110000...00

Collection Conversation Mask: 11110000...00
Distribution Conversation Mask: 11110000...00
Conversation Mask State: 10000000

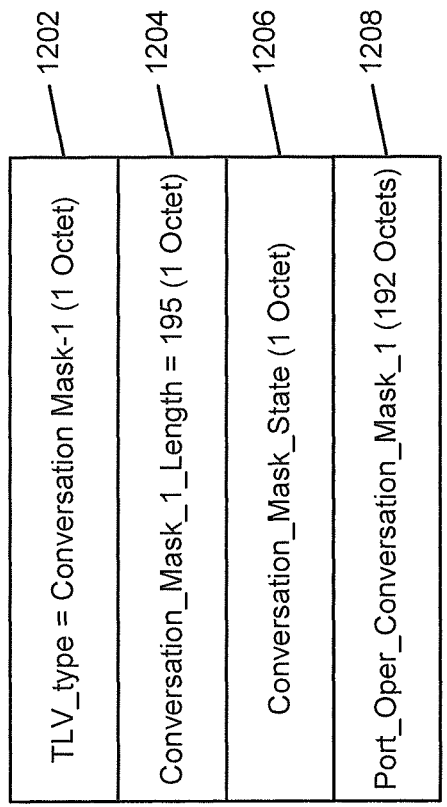
FIG. 12A
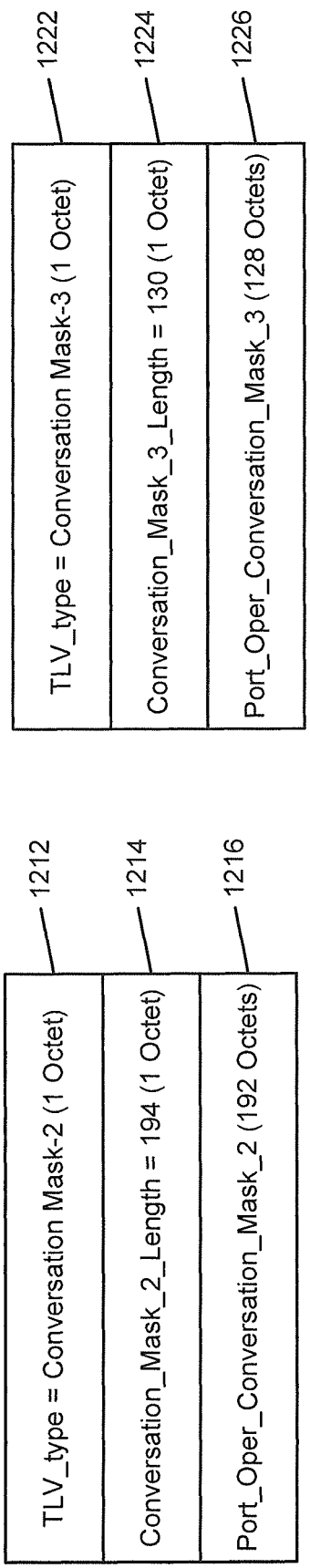
FIG. 12C
FIG. 12B

| TLV | Type Field |
|---|---|
| Port Algorithm TLV | 0X04 |
| Port Conversation ID Digest TLV | 0X05 |
| Port Conversation Mask-1 | 0X06 |
| Port Conversation Mask-2 | 0X07 |
| Port Conversation Mask-3 | 0X08 |
| Port Conversation Service Mapping TLV | 0X09 |

TLV Included in An Enhanced LACPDU 1300

FIG. 13

METHOD AND SYSTEM OF IMPLEMENTING CONVERSATION-SENSITIVE COLLECTION FOR A LINK AGGREGATION GROUP

CROSS-REFERENCE TO RELATED APPLICATIONS

This application is a continuation of U.S. application Ser. No. 14/134,966, filed Dec. 19, 2013 (now U.S. Pat. No. 9,497,132, issued Nov. 15, 2016), which is hereby incorporated by reference. This application also claims the benefit of U.S. Provisional Application No. 61/815,200, filed Apr. 23, 2013; U.S. Provisional Application No. 61/815,203, filed Apr. 23, 2013; and U.S. Provisional Application No. 61/865,125, filed Aug. 12, 2013, which are hereby incorporated by reference.

TECHNICAL FIELD

The embodiments of the present invention generally relate to link aggregation, and more particularly relate to methods and apparatus for conversation-sensitive collection for a Link Aggregation Group (LAG).

BACKGROUND

As illustrated in FIG. 1A, link aggregation is a network configuration and process used to aggregate multiple links between a pair of nodes 120, 122 in the network to enable transmission of user data on each of the links participating in a Link Aggregation Group (LAG) 101 (see, e.g., Institute of Electrical and Electronics Engineers (IEEE) standard 802.1AX). Aggregating multiple network connections in this fashion can increase throughput beyond what a single connection can sustain, and/or can be used to provide resiliency in case of a failure of one of the links. The "Distributed Resilient Network Interconnect" (DRNI) 102 (see Clause 8 of IEEE 802.1AX-REV/D1.0) specifies extensions to link aggregation in order to be able to use link aggregation on a network interface even between more than two nodes, for example between four nodes K, L, M and O as illustrated in FIG. 1B.

As shown in FIG. 1B, a LAG is formed between Network 150 and Network 152. More specifically, a LAG is formed between LAG virtual nodes or 'portals' 112, 114. The first LAG virtual node or portal 112 includes a first node (K) and a second node (L). The second LAG virtual node or portal 114 includes a third node (M) and a fourth node (O). These nodes can also be referred to as "Portal Systems". Note that both the first and second LAG virtual nodes or portals 112, 114 may include a single or more than two nodes in a portal. LAG Nodes K and M are connected as peer nodes, and LAG Nodes L and O are also connected as peer nodes. As used in this application, a "LAG virtual node" refers to a DRNI portal in the IEEE documentation discussed above (i.e., two or more nodes that appear as a single node to their respective peers). Additionally, the statement that virtual node or portal 112 "includes" two nodes K, L means that the virtual node or portal 112 is emulated by the nodes K, L, this can be referred to as an "emulated system." Similarly, the statement that virtual node or portal 114 "includes" two nodes M, O means that the virtual node or portal 114 is emulated by the nodes M, O. Note that link aggregation group 161 is also formed between K-M and L-O links.

Multiple nodes participating in the LAG appear to be the same virtual node or portal with a single System ID to their peering partner in the LAG. The System ID is used to identify each node (e.g., node K, node L, node M, and node O). The System ID is included in Link Aggregation Control Protocol Data Units (LACPDUs) sent between the individual partner nodes of the LAG (e.g., between K and M or between L and O). The System ID can be generated based on identifiers of the constituent nodes of a portal using any individual identifier or any combination thereof. A common and unique System ID for the corresponding LAG virtual node or portal can be consistently generated. Thus, as shown in FIG. 1B, node K and node L belong to the same Network 150 and they are part of the same DRNI Portal 112 (i.e., the same LAG virtual node), and use a common System ID of "K" for the emulated LAG virtual node 112. Similarly, Nodes M and O of Network 152 are seen as a single LAG virtual node or portal 114 with a System ID "M" by Nodes K and L.

FIG. 1B also shows the DRNI link allocation of a particular service (see bold link between K and M in FIG. 1B). The service allocation of an interface may involve a Virtual Local Area Network (VLAN), and an identifier for the service may be a VLAN Identifier (VID), such as a Service VID (i.e., "S-VID") (typically identifying services on Network to Network Interfaces (NNIs)) or a Customer VID (i.e. "C-VID") (typically identifying services on User to Network Interfaces (UNIs)). (Note that B-VIDs are indistinguishable from S-VIDs as they have the same Ethertype.) In the example of FIG. 1B, the service is allocated to the upper link (between upper nodes K, M). The upper link is thus chosen as the "working" link and the lower link (between nodes L, O) is the "standby" link or "protection" link. Service link allocation, i.e. using the same physical link for frame transmission both in the forward and in the backward directions is highly desirable.

Transmitted frames may be dynamically redistributed, and such redistribution may result from a removed or added link or a change in a load-balancing scheme. Traffic redistribution occurring in the middle of a traffic flow may cause disordered frames. In order to ensure that frames are not duplicated or reordered due to this redistribution, the Link Aggregation uses a Marker Protocol. The aim of using the Marker Protocol is to detect when all the frames of a given traffic flow are successfully received at a remote peer node. In order to accomplish this, LACP transmits Marker Protocol Data Units, PDUs, on each of the port channel links. The partner system responds to a received Marker PDU once it has received all the frames transmitted on this link prior to the Marker PDU. The partner system then sends a Marker response PDU for each received Marker PDU. Once the Marker response PDUs are received by the local system on all member links of the portal, the local system can redistribute the frames in the traffic flow thereby avoiding any risk of frame disordering. However, it can be problematic to ensure that a Marker response PDU works properly in a DRNI where either or both peer nodes of the LAG can comprise multiple systems. Measures must therefore be taken in order to ensure that frame ordering is maintained for certain sequences of frame exchanges—known as conversations—between ports in such LAGs.

SUMMARY

A method is disclosed that is to be executed by a network device for implementing conversation-sensitive collection for frames received on a port of a link of a link aggregation group. The network device executes an aggregator to collect the frames for aggregator clients, where a received frame is associated with a service identifier and a conversation identifier. The service identifier identifies a conversation at a link level for a service. The conversation identifier identifies the conversation a link aggregation group, where the conversation consists of an ordered sequence of frames, and where the conversation-sensitive collection maintains the ordered sequence by discarding frames of conversations not allocated to the port. The method includes receiving the frame over the link of the link aggregation group at the network device. A conversation identifier is then determined for the frame. The conversation identifier is compared with port conversation allocation. The frame is in response to a non-match of the conversation identifier with the port conversation allocation, and the frame is forwarded to an aggregator client in response to a match of the conversation identifier with the port conversation allocation.

A network device is configured to implement conversation-sensitive collection for frames received on a port of a link of a link aggregation group. The network device executes an aggregator to collect the frames for aggregator clients, where a received frame is associated with a service identifier and a conversation identifier. The service identifier identifies a conversation at a link level for a service. The conversation identifier identifies the conversation at a link aggregation group, where the conversation consists of an ordered sequence of frames, and where the conversation-sensitive collection maintains the ordered sequence by discarding frames of conversations not allocated to the port. The network device includes a set of aggregation ports configured to receive a frame over the link of the link aggregation group. The network devices also include a network processor that is coupled to the set of aggregation ports. The network processor is configured to execute a link aggregation sublayer including a frame collector. The frame collector is configured to determine the conversation identifier, compare the conversation identifier with port conversation allocation, discard the frame in response to a non-match of the conversation identifier with the port conversation allocation, and forward the frame to an aggregator client in response to a match of the conversation identifier with the port conversation allocation.

A non-transitory computer-readable storage medium has instructions stored therein which when executed by a processor, causes the processor to perform operations for implementing conversation-sensitive collection for frames received on a port of a link of a link aggregation group. The operations when executed cause an aggregator to collect the frames for aggregator clients, where a received frame is associated with a service identifier and a conversation identifier. The service identifier identifies a conversation at a link level for a service. The conversation identifier identifies the conversation at a link aggregation group, where the conversation consists of an ordered sequence of frames, and where the conversation-sensitive collection maintains the ordered sequence by discarding frames of conversations not allocated to the port. The operations include receiving a frame over the link of the link aggregation group at the network device. The conversation identifier is then determined for the frame. The conversation identifier is compared with port conversation allocation. The frame is in response to a non-match of the conversation identifier with the port conversation allocation, and the frame is forwarded to an aggregator client in response to a match of the conversation identifier with the port conversation allocation.

The advantages of the process include enforcement of the port conversation allocation scheme, where conversations are allocated to specific ports. The enforcement according to this process ensures that frames of a given conversation that arrive on a non-allocated aggregation port are recognized as out of order, for example as the result of conversation re-allocation to another aggregation port or similar issue. The process recognizes frames received at a port where the conversation was not allocated and discards these frames to prevent out of order delivery of frames of a conversation.

BRIEF DESCRIPTION OF THE DRAWINGS

The invention may best be understood by referring to the following description and accompanying drawings that are used to illustrate embodiments of the invention. In the drawings:

FIG. 1A is a diagram of one embodiment of a Link Aggregation Group between two network devices.

FIG. 1B is a diagram of one embodiment of two Portals connecting two networks via a Link Aggregation Group.

FIG. 3 is a flowchart illustrating a process of updating conversation allocation of an aggregation port according to one embodiment of the invention.

FIG. 4A illustrates a conversation mask TLV for an aggregation port according to one embodiment of the invention.

FIG. 4B illustrates a conversation mask state field within a conversation mask TLV of an aggregation port according to one embodiment of the invention.

FIG. 4C illustrates a port operation conversation mask of an aggregation port of a link aggregation group at a network device according to one embodiment of the invention.

FIGS. 8A-D illustrate a sequence of updating a conversation mask of an aggregation port according to one embodiment of the invention.

FIGS. 12A-C illustrate conversation mask-1 to mask 3 TLVs for an aggregation port according to one embodiment of the invention.

FIG. 13 illustrates a set of TLVs required for supporting the conversation-sensitive frame collection and distribution functionalities according to one embodiment of the invention.

DETAILED DESCRIPTION

Figure 2:
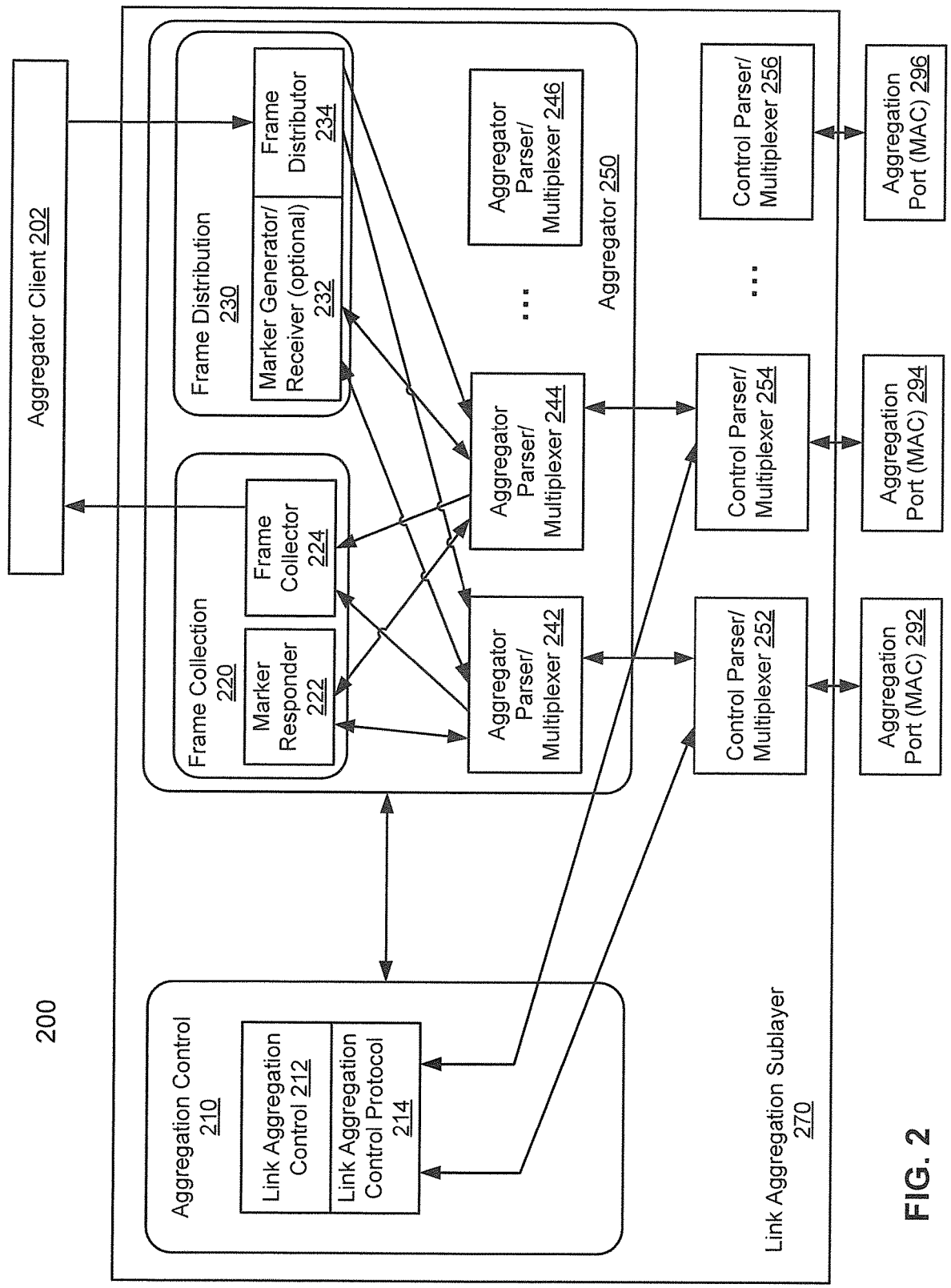
FIG. 2 is a diagram of one embodiment of a Link Aggregation Sublayer.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Terms

The following terms may be used in the description.

Actor: The local entity (i.e., node or network device) in a Link Aggregation Control Protocol (LACP) exchange.

Aggregation Key: A parameter associated with each Aggregation Port and with each Aggregator of an Aggregation System identifying those Aggregation Ports that can be aggregated together. Aggregation Ports in an Aggregation System that share the same Aggregation Key value are potentially able to aggregate together.

Aggregation Port: A Service Access Point (SAP) in an Aggregation System that is supported by an Aggregator.

Aggregation System: A uniquely identifiable entity comprising (among other things) an arbitrary grouping of one or more aggregation ports for the purpose of aggregation. An instance of an aggregated link always occurs between two aggregation systems. A physical device may comprise a single aggregation system or more than one aggregation system.

Aggregation Client: The layered entity immediately above the Link Aggregation Sublayer, for which the Link Aggregation Sublayer provides an instance of the Internal Sublayer Services (ISS).

Aggregator: A logical media access control (MAC) address, bound to one or more Aggregation Ports, through which the Aggregator Client is provided access to the physical media.

Conversation: A set of frames transmitted from one end station to another, where all the frames form an ordered sequence, and where the communicating end stations require the ordering to be maintained among the set of frames exchanged.

Data Terminal Equipment (DTE): Any source or destination of data connected to the local area network.

Distributed Relay (DR): A functional entity, distributed over a Portal by a DR Function in each of the Aggregation Systems comprising a Portal, which distributes outgoing frames from Gateways to Aggregators, and distributes incoming frames from Aggregators to Gateways.

Distributed Resilient Network Interconnect (DRNI): Link Aggregation expanded to include either a Portal and an Aggregation System, or two Portals.

DR Function: The part of a Distributed Relay residing within a single Portal System.

Gateway: A connection, typically virtual (not a physical link between systems) connecting a Distributed Relay to a System, consisting of a Gateway Link and two Gateway Ports.

Internal Sublayer Service (ISS): An augmented version of the MAC service, defined in IEEE Std 802.1AC-2012.

Link Aggregation Group (LAG): A group of links that appear to an Aggregator Client as if they were a single link. A Link Aggregation Group can connect two Aggregation Systems, an Aggregation System and a Portal, or two Portals. One or more conversations may be associated with each link that is part of a Link Aggregation Group.

Partner: The remote entity (i.e., node or network device) in a Link Aggregation Control Protocol exchange.

Port conversation identifier (ID): A conversation identifier value that is used to select frames passing through an Aggregation Port.

Portal: One end of a DRNI; including one or more Aggregation Systems, each with physical links that together comprise a Link Aggregation Group. The Portal's Aggregation Systems cooperate to emulate the presence of a single Aggregation System to which the entire Link Aggregation Group is attached.

Type/Length/Value (TLV): A short, variable length encoding of an information element consisting of sequential type, length, and value fields where the type field identifies the type of information, the length field indicates the length of the information field in octets, and the value field contains the information itself. The type value is locally defined and needs to be unique within the protocol defined in this standard.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically include ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network device can store one or more bridging tables that are used to forward data based on the layer 2 information in that data.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

Some network devices provide support for VPLS (Virtual Private LAN Service) (RFC 4761 and 4762). For example, in a VPLS network, subscriber end stations access content/services provided through the VPLS network by coupling to CEs, which are coupled through PEs coupled by other network devices. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

Network devices can also support native L2 network technologies and device types including VLAN bridged networks supported by C-VLAN bridges, provider bridges, provider backbone bridges, provider backbone bridges— traffic engineering (TE) (as defined in IEEE std 802.1ad-2005, IEEE std 802.1ah-2008, IEEE std 802.1aq/D2.1, IEEE std 802.1Q-2011) and similar technologies and network device types. The above listing of network device types and supported technologies is provided by way of example and not limitation. One skilled in the art would understand that other technologies, standards and device types can be included as network devices as used herein.

Link Aggregation Sublayer

FIG. 2 is a diagram of one embodiment of Link Aggregation Sublayer 200. Aggregator client 202 communicates with a set of aggregation ports 292, 294, 296 through aggregator 250. In one embodiment, aggregator 250 presents a standard IEEE Std 802.1Q Internal Sublayer Service (ISS) interface to aggregator client 202. Aggregator 250 binds to one or more aggregation ports including aggregation Ports 292, 294, 296. Aggregator 250 distributes frame transmissions from aggregator client 202 to aggregation Ports 292, 294, 296, and to collect received frames from aggregation Ports 292, 294, 296 and pass them to aggregator client 202 transparently.

The binding of aggregation ports 292, 294, 296 to aggregator 250 is managed by link aggregation control 210, which is responsible for determining which links can be aggregated, aggregating them, binding aggregation ports to an appropriate aggregator, and monitoring conditions to determine when a change in aggregation is needed. Such determination and binding can be under manual control through direct manipulation of the state variables of link aggregation (e.g., through aggregation keys) by a network manager. In addition, automatic determination, configuration, binding, and monitoring may occur through the use of Link Aggregation Control Protocol (LACP) 214. LACP 214 uses peer exchanges across the links to determine, on an ongoing basis, the aggregation capability of the various links, and continuously provides the maximum level of aggregation capability achievable between a given pair of Aggregation Systems.

An Aggregation System can contain multiple aggregators, serving multiple aggregator clients. A given aggregation port will bind to (at most) a single aggregator at any time. An aggregator client is served by a single aggregator at a time.

Frame ordering is maintained for certain sequences of frame exchanges between aggregator clients (known as conversations). Frame distributor 234 ensures that all frames of a given conversation are passed to a single aggregation port. For a given conversation, frame collector 224 is required to pass frames to aggregator client 202 in the order that they are received from the aggregation port. Frame collector 224 is otherwise free to select frames received from aggregation ports 292, 294, 296 in any order. Since there are no means for frames to be misordered on a single link, this ensures that frame ordering is maintained for any conversation. Conversations can be moved among aggregation ports within a Link Aggregation Group, both for load balancing and to maintaining availability in the event of link failures.

Aggregation ports 292, 294, 296 are each assigned media access control (MAC) addresses, which are unique over the Link Aggregation Group and to any bridged local area network (LAN) (e.g., one complying with IEEE 802.1Q Bridged LAN) to which the Link Aggregation Group is connected. These MAC addresses are used as the source addresses for frame exchanges that are initiated by entities within Link Aggregation Sublayer 270 itself (i.e., LACP 214 and Marker protocol exchanges).

Aggregator 250 (and other aggregators if deployed) is assigned a MAC address, unique over the Link Aggregation Group and to bridged LAN (e.g., one complying with IEEE 802.1Q Bridged LAN) to which the Link Aggregation Group is connected. This address is used as the MAC address of the Link Aggregation Group from the perspective of the aggregator client 202, both as a source address for transmitted frames and as the destination address for received frames. The MAC address of aggregator 250 may be one of the MAC addresses of an aggregation port in the associated Link Aggregation Group.

Distributed Resilient Network Interconnect (DRNI)

Link aggregation creates a Link Aggregation Group that is a collection of one or more physical links that appears, to higher layers, to be a single logical link. The Link Aggregation Group has two ends, each terminating in an Aggregation System. DRNI expands the concept of link aggregation so that, at either or both ends of a link aggregation group, the single Aggregation System is replaced by a Portal, each composed from one or more Aggregation Systems.

DRNI is created by using a distributed relay to interconnect two or more systems, each running link aggregation, to create a Portal. Each Aggregation System in the Portal (i.e., each Portal System) runs link aggregation with a single aggregator. The distributed relay enables the Portal Systems to jointly terminate a Link Aggregation Group. To all other Aggregation Systems to which the Portal is connected, the Link Aggregation Group appears to terminate in a separate emulated Aggregation System created by the Portal Systems.

A Set of Embodiments of Updating Conversation Allocation

FIG. 3 is a flowchart illustrating a process of updating conversation allocation of an aggregation port according to one embodiment of the invention. The operations of this and other flowcharts will be described with reference to the exemplary embodiments of the other diagrams (e.g., the embodiment illustrated in FIG. 11). However, it should be understood that the operations of the flowcharts can be performed by embodiments of the invention other than those discussed with reference to these other diagrams, and the embodiments of the invention discussed with reference to these other diagrams can perform operations different than those discussed with reference to the flowcharts.

The process illustrated in FIG. 3 may be implemented in a network containing one or more network devices deploying one or more link aggregation groups such as network devices 120 and 122 of FIG. 1A and network devices comprising portals 112 and 114 of FIG. 1B. The process is for updating conversation allocation of an aggregation port of a link aggregation group when the link aggregation group transmits one or more conversations, where each conversation is associated with a service or an application in the network.

The process starts with verifying that an implementation of a conversation-sensitive link aggregation control protocol (LACP) is operational at block 301. The implementation of a conversation-sensitive LACP needs to be operational, that is, the LACP needs to be able to coordinate conversation-sensitive frame collection and distribution of a pair of actor and partner network devices. For example, the verification of block 301 may be performed by verifying the implementation of a conversation-sensitive LACP being able to transmit and receive LACPDUs indicating port algorithms (used to assign frames to various conversations) by actor and partner network devices respectively. That is, the verification includes verifying that a port algorithm used by a network device (an actor network device) can be sent through the implementation of a conversation-sensitive LACP to the partner network device. In an alternative or additional embodiment, the verification includes verifying the consistency of the conversation identifier digest and conversation service mapping digest as discussed in further detail herein below. Without the verification, the network device does not know if it can communicate conversation-sensitive information through LACP, and the process for receiving conversation-sensitive LACP information is ignored. When verification fails, a network device sends out a notification for management action.

The process flows to block 303 after verifying that the implementation of a conversation-sensitive LACP is operational. At block 303, the network device determines that operations through enhanced LACPDUs are possible based at least partially on a compatibility check. The enhanced LACPDUs are the ones that can be used for updating conversation allocation information through the link aggregation group, and they cannot operate under all conditions. The compatibility check determines whether a set of operational parameters of the network device associated with the aggregation port matches a matching set of operational parameters of a partner network device associated with the matching port at the partner network device. The partner network device is a remote network device communicatively coupled with the network device. If the sets of operational parameters match with each other, process 300 continues. Optionally, if the sets of operational parameters do not match, a notification can be sent out to a management system of the link aggregation group and an operator of the network may resolve the mismatch.

The enhanced LACPDUs are different from traditional LACPDUs. A traditional LACPDU such as one complying with version one of the IEEE standard 802.1AX has a frame size of 128 octets. If each bit of the 128 octets is used to indicate a state of a conversation, the traditional LACPDU can only contain up to 128×8=1024 conversations. Yet, a link aggregation group may support more than 1024 conversations. For example, some embodiments may require support for up to 4096 conversations, thus these embodiments a traditional LACPDU is not sufficient, and a different type of LACPDU, referred to as an enhanced LACPDU, is utilized for process 300. In one embodiment, an enhanced LACPDU includes fields for port algorithm TLV, port conversation ID digest TLV, port conversation mask(s), and/or port conversation service mapping TLV.

After confirming that the operations through enhanced LACPDUs are possible, the process then goes to block 305, where a conversation allocation state of an aggregation port of the link aggregation group of the network device is updated. The update is based on a determination that the conversation allocation state of the aggregation port is incorrect. The conversation allocation state indicates a list of conversations transmitted through the aggregation port. For example, when each conversation is identified with a conversation identifier (ID), a conversation allocation state of the aggregation port may contain a set of conversation IDs, indicating the set of conversations passing through the port.

Under some circumstances, the conversation state of the aggregation port of the network device may lose synchronization with the aggregation port of the partner network device. For example, an aggregation port of the link aggregation group at the network device may be set to transmit/receive conversations identified as conversations 1-5, thus the conversation allocation state of the aggregation port indicates conversations 1-5 go through the aggregation port. Yet the matching port of the link aggregation group at the partner network device may be set to transmit/receive conversations identified as conversations 1-7 (for example, due to some other port at the partner network device out of service). The conversation allocation state of the aggregation port of the network device is out of synchronization with the partner network device thus it is deemed incorrect. Similar problem happens when another port of the same link aggregation group at the network device is set to transmit/receive conversations identified as conversations 5-7. In this case, the conversation allocation state of the aggregation port is out of synchronization with the other port of the same link aggregation group and conversation 5 cannot pass both ports and maintain the order of the frames of the conversation. Put another way, the synchronization failure can be characterized simply as a failure or malfunction of the distribution algorithm (or related processes) on the one side of the LAG to ensure that conversations are only allocated to a single port. Once the conversation allocation state of the aggregation port is determined to be incorrect, the conversation allocation state of the aggregation port is updated. For example, it is updated to match the conversation allocation state of the matching port at the partner network device or match the conversation allocation state of another port of the same link aggregation group at the network device.

Embodiments of TLVs for Communicating Conversation Allocation States of Aggregation Ports Conversation allocation state of an aggregation port needs to be represented in data format to be transmitted through LACP. TLV format has been used to communicate conversation allocation states of aggregation ports in one embodiment of the invention. FIG. 4A illustrates a conversation mask TLV for an aggregation port according to one embodiment of the invention. Conversation mask TLV 400 contains four fields: TLV type 402, conversation mask length 404, conversation mask state 406, and port operation conversation mask 408. The fields may not be positioned in the order illustrated in FIG. 4A in other embodiments, and other embodiments may contain more or less fields.

TLV type 402 indicates the nature of the information carried in the TLV tuple. Conversation mask TLV is identified by the integer 0x06 in one embodiment. Conversation mask length 404 (labeled as Conversation_Mask_Length in FIG. 4A) indicates the length in octets of the TLV tuple. The total length of the conversation mask TLV is 515 octets, thus the field includes the value of 515. In a different embodiment, conversation mask length 404 contains a value more or less than 515.

Conversation mask state (labeled as Conversation_Mask_State in FIG. 4A) indicates a state of conversation mask. FIG. 4B illustrates a conversation mask state field within a conversation mask TLV of an aggregation port according to one embodiment of the invention. Conversation mask state 450 (an embodiment of conversation mask state 406) contains eight bits (one octet), where seven bits out of the eight bits are reserved for future use (reserved 411-414). The one remaining bit is a flag indicating if the conversation mask used by the frame distributor of an aggregation port of a link aggregation group of a network device is the same or not as the conversation mask used by the frame distributor of the associated aggregation port of the link aggregation group of a partner network device. The flag is thus a synchronization flag, referred to as ActPar_Sync 410 in FIG. 4B. In one embodiment, the synchronization flag is a Boolean value and indicates TRUE if the conversation mask used by the frame distributor of the aggregation port of a local network device is the same as the conversation mask used by the frame distributor of the aggregation port of the partner network device, otherwise it indicates FALSE.

Port operation conversation mask 408 (labeled as Port_Oper_Conversation_Mask in FIG. 4A) contains the value of Boolean vector indicating whether the indexed port conversation identifier (ID) is distributed through a particular aggregation port. The value of Boolean vector is constructed from a priority selection agreement in one embodiment. The priority selection agreement indicates a given conversation goes to a single aggregation port of a link aggregation group. Based on the information, port operation conversation mask can be constructed to indicate which conversation, indexed by conversation identifier, is transmitted on the aggregation port.

FIG. 4C illustrates a port operation conversation mask of an aggregation port of a link aggregation group at a network device according to one embodiment of the invention. Port conversation mask 470 (labeled as Port_Oper_Conversation_Mask in FIG. 4C) is an embodiment of port operation conversation mask 408 and it contains 4096 bits (512 Octets×8 bits per Octet=4096 bits), and each bit indicates whether a given conversation is transmitted (or received; transmitted where it is the mask of the distributor and received where it is the mask of the collector, the example of transmission is given here) through the aggregation port or not. As illustrated, reference 420 at bit 0 is for conversation 0, reference 421 at bit 1 is for conversation 1 (i.e., Conversation ID=1, the same applies to other conversations), and references 422 at bit 2 and 423 at bit 3 are for conversation 2 and 3 respectively. Finally, reference 424 at bit 4095 indicates whether conversation 4095 is transmitted on the aggregation port or not. In one embodiment, the Boolean value of a conversation indicates TRUE when the conversation is transmitted through the aggregation port. When the link aggregation group can support up to 4096 conversations (addressable with 12 bits), port conversation mask 470 of 512 octets can indicate all permutations of possible conversations transmitting through the link aggregation port. Note that some embodiments may support more or less than 4096 conversations, and the length of a port operation conversation mask can be implemented accordingly to accommodate different maximum number of conversations.

Note that conversation mask TLV 400 contains 515 octets, and it is much longer than 128 octets, which is the length of LACPDU in version 1 of the IEEE 802.1AX standard. Thus, a "long" LACPDU is needed for transmitting conversation mask TLV in one embodiment of the invention.

In another embodiment, the port conversation mask is implemented using multiple TLVs. FIGS. 12A-C illustrate an embodiment where the conversation mask is implemented using three TLVs, conversation mask-1 to mask-3 TLVs, for an aggregation port according to one embodiment of the invention. Referring to FIG. 12A, conversation mask-1 TLV 1200 contains four fields, similar to conversation mask TLV 400 of FIG. 4A: TLV type 1202, conversation mask-1 length 1204, conversation mask state 1206, and port operation conversation mask-1 1208.

TLV type 1202 identifies the type of information carried in the TLV tuple. Conversation mask-1 TLV can be identified by the integer 0x06 in one embodiment. Conversation mask-1 length 1204 (labeled as Conversation_Mask_1_Length in FIG. 12A) indicates the length in octets of the TLV tuple. In one example embodiment, the length of the conversation mask-1 TLV is 195 octets, thus the field 1204 includes the value of 195. Conversation mask state 1206 and port operation conversation mask 1208 are fields that are structured similarly to those of the conversation mask state 406 and port operation conversation mask 408 describe herein above with reference FIGS. 4B and 4C respectively in one embodiment.

FIG. 12B illustrates conversation mask-2 TLV for an aggregation port according to one embodiment of the invention. Conversation mask-2 TLV 1210 contains three fields, a TLV type 1212, conversation mask-2 length 1214, and port operation conversation mask-2 1216. These fields serve similar functions to the corresponding fields of Conversation mask-1 TLV 1200 respectively.

FIG. 12C illustrates conversation mask-3 TLV for an aggregation port according to one embodiment of the invention. Conversation mask-3 TLV 1220 also contains three fields, a TLV type 1222, conversation mask-3 length 1224, and port operation conversation mask-3 1226. These fields serve similar functions to the corresponding fields of Conversation mask-1 TLV 1210 respectively. In one example embodiment, the length of conversation mask-3 is 130 octets and the total length of the three combined port conversation masks is 512 octets. The first two conversation masks have included 384 octets (i.e., 192 octets each) for the port operation conversation mask, leaving only 130 octets needed for the third port conversation mask-to equal the size of the port conversation mask described herein above with reference to FIGS. 4A-C. Thus, one skilled in the art would understand that this alternate embodiment with three conversation mask TLVs can be used in place of a single TLV, further the TLV could be divided into any number of separate TLVs according to the same principles discussed here. Similarly, where embodiments are discussed herein with reference to utilizing a single conversation mask TLV, it would be understood that alternate embodiments with multiple conversation mask TLVs are also contemplated.

Figures 5A, 5B:
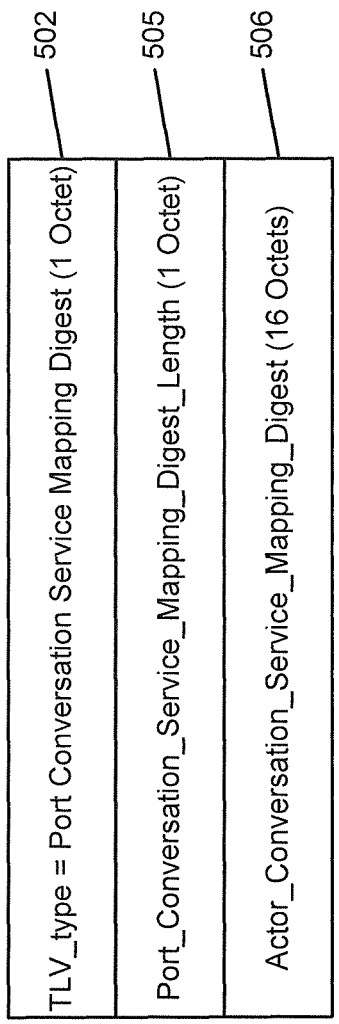
FIG. 5A is a diagram of one embodiment of a port conversation service mapping TLV.
FIG. 5B is a diagram of one embodiment of an aggregated administrative service conversation map.

FIG. 5A is a diagram of one embodiment of a TLV that can be included in the enhanced LACPDUs to exchange information about the state of the Conversation ID Digests maintained by each Aggregation System. The TLV is here called a port conversation service mapping TLV. The TLV includes a set of fields 502, 505, and 506 with the following field definitions: TLV_type 502, which includes a value indicating that the TLV type is a Port Conversation Service Mapping digest. A digest is a cryptographic hash or similar processing of data to generate an identifier that can be used to uniquely (or nearly uniquely) identify the processed data, enabling error checking and file content comparison (e.g., where the contents of two files differ, their digests will differ). This field indicates the nature of the information carried in this TLV-tuple. In one embodiment, the Port Conversation Service Mapping Digest TLV can be identified by the integer value 0x0A. The second field is the Port_Conversation_Service Mapping Digest_Length field 505. This field indicates the length (in octets) of this TLV-tuple. In one embodiment, the Port Conversation Service Mapping Digest TLV uses a length value of 18 (0x12). The third field is the Actor_Conversation_Service_Mapping_Digest 506. This field contains the value of the message digest (MD5) computed from aAggAdminServiceConversationMap[ ] for exchange with the Partner system. The aAggAdminServiceConversationMap[ ] is an array of Service ID to Conversation ID mappings maintained by the network device. There are 4096 aAggAdminServiceConversationMap[ ] variables, aAggAdminServiceConversationMap[0] through aAggAdminServiceConversationMap[4095], indexed by Port Conversation ID. Each contains, in general, a set of Service IDs, unique within the array. If the Service IDs are representing VIDs, only a single VID is applicable, while in the case that Service IDs are representing I-SIDs, more than one I-SIDs is possible. The MD5 digest value can be compared by the Partner systems to determine whether there are differences between the mappings maintained by each Partner system.

FIG. 5B is a diagram of one embodiment of an aggregated administrative service conversation map. The diagram illustrates the fields for aggregated administrative service conversation map, which is an array that is indexed by a Port Conversation ID and contains the Service ID or an integer representing the Service ID. In one embodiment, the aggregated administrative service conversation map (aAggAdminServiceConversationMap[ ]) is an array of 4096 integers, such as 32 bit or 64 bit integers. In other embodiments, the array can have any size, number, or type of values. The aggregated administrative service conversation map can be used to translate Service IDs to Conversation IDs and vice versa. A Conversation ID can be used to index into the array to recover the Service ID. The array can be traversed to find a Service ID and the corresponding index is the Conversation ID.

FIG. 13 illustrates a set of TLVs required for supporting the conversation-sensitive frame collection and distribution functionalities according to one embodiment of the invention, The set of TLVs include a port algorithm TLV, port conversation ID digest TLV, port conversation mask-1 to mask-3 TLVs, and port conversation service mapping TLV. Each of the TLVs has been discussed herein. In one example embodiment, port algorithm TLV 1302 has a type field value of 0x04. Port conversation ID digest TLV has a type field value of 0x05. Port conversation mask-1 to mask-3 have type field values of 0x06 to 0x08 respectively. In one embodiment, the set of TLVs forms an enhanced LACPDU to implement embodiments of the invention illustrated in FIGS. 3-6 and discussed herein.

Another Set of Embodiments of Updating Conversation Allocation

Figure 6:
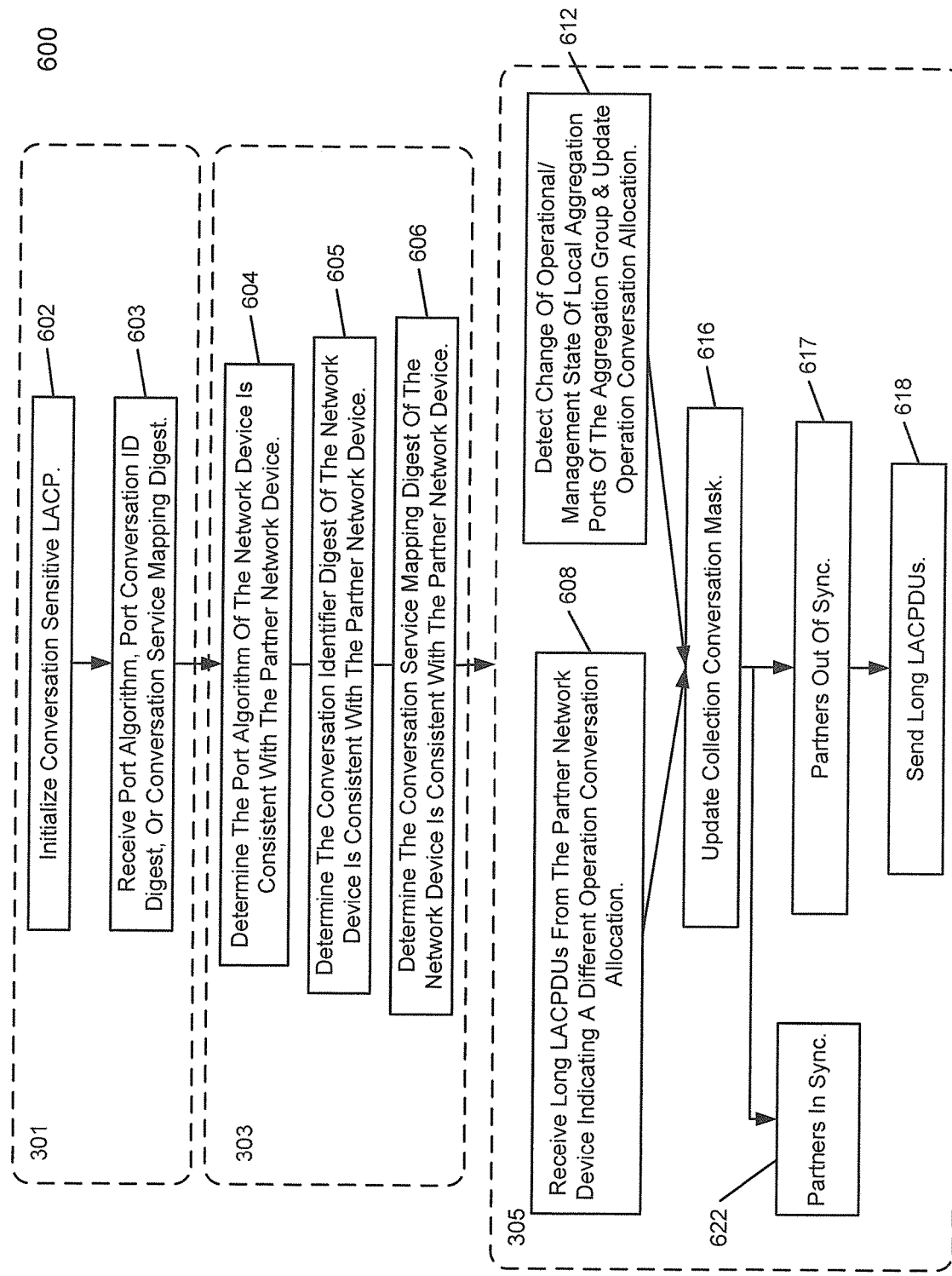
FIG. 6 is another flowchart illustrating a process of updating conversation allocation of an aggregation port according to one embodiment of the invention.

FIG. 6 is another flowchart illustrating a process of updating conversation allocation of an aggregation port according to one embodiment of the invention. The process may be implemented in a network containing one or more network devices deploying a link aggregation group such as network devices 120 and 122 of FIG. 1A. The process may also be implemented at portals 112 and 114 of FIG. 1B. Note process 600 is illustrated with blocks 602-616, and they are covered by dotted lines of blocks 301-305 to indicate that process 600 is one embodiment of the invention implementing process 300.

Referring to FIG. 6, the process starts with initializing conversation-sensitive LACP at block 602. In one embodiment, the initialization includes recording a default port algorithm for a partner network device as the current operational port algorithm of the partner network device at a network device (e.g., using a function of recordDefaultPortAlgorithm( ) to record the default port algorithm as the current operational parameter of the partner network device at the network device. The initialization may include recording a default conversation port conversation identifier (ID) digest for a partner network device as the current operational parameter of the conversation port digest of the partner network device at the network device (e.g., using a function of recordDefaultConversationPortDigest( ) to record the default conversation port conversation ID digest as the current operational parameter of the partner network device at the network device). The initialization may further include recording a default conversation mask for a partner network device as the current operational conversation mask of the partner network device at the network device (e.g., using a function of recordDefaultConversationMask( ) to record the default conversation mask as the current operational parameter of the partner network device at the network device). Furthermore, the initialization may include recording a default conversation service mapping digest for a partner network device as the current operational conversation service mapping digest of the partner network device at the network device (e.g., using a function of recordDefaultConversationServiceMappingDigest( ) to record the default conversation service mapping digest as the current operational parameter of the partner network device at the network device). With the operational parameters of the partner network device is recorded using default values, the conversation-sensitive LACP is initialized.

The process continues with the network device receiving information about port algorithm from the partner network device, port conversation ID digest, and/or a conversation service mapping digest at block 603. The received information will be used to record parameter values as the operational values for the network device. The information is received at the network device as TLVs embedded in LACPDUs. The information about port algorithm identifying a port algorithm and being carried in a recordPortAlgorithmTLV and the carried value is recorded as the current operational parameter value of the partner network device (e.g., the operational parameter is Partner_Port_Algorithm). The information about port conversation ID digest is carried in a recordConversationPortDigestTLV and the carried value is recorded as the current operational parameter value of the partner network device (e.g., the operational parameter is Partner_Conversation_PortList_Digest). Additionally, the information about the conversation service mapping digest is carried in a recordConversationServiceMappingDigestTLV and the carried value is recorded as the current operational parameter value of the partner network device (e.g., the operational parameter is Partner_Admin_Conversation_PortList_Digest). Once the information is received, the conversation-sensitive is verified to be operational as described in block 301 of FIG. 3. Similar to block 303 of FIG. 3, process 600 flows to blocks 604-606 and perform operations to determine that operations through enhanced LACPDUs are possible based at least partially on a compatibility check.

Referring to FIG. 6, the network device determines if the port algorithm used by the network device is the same as the partner network device for a link aggregation group at block 604. The operational port algorithm of the network device may be stored in a variable such as Actor_Port_Algorithm for the link aggregation group, while the operational port algorithm of the partner network device may be stored in a variable such as Partner_Port_Algorithm for the same link aggregation group. The network device compares the two variables and determines if they are consistent. For example, a function such as Differ_Port_Algorithms may be used, where Differ_Port_Algorithms returns a Boolean indicating that the port algorithms used by the network device and the partner network device at the two ends of the same link aggregation group are same or not. If the two variables are inconsistent, optionally a notification is sent out to notify an operator of the link aggregation group to resolve the anomaly.

If the two variables are consistent, the flow goes to block 605, where the network device determines if the conversation ID digest used by the network device is the same as the partner network device for the link aggregation group. The operational conversation ID digest of the network device may be stored in a digest such as Actor_Conversation_PortList_Digest, while the operational conversation ID digest of the partner network device may be stored in a digest such as Partner_Conversation_PortList_Digest. The network device compares the two digests and determines if they are consistent. For example, a function such as Differ_Port_Conversation_Digests may be used, where Differ_Port_Conversation_Digests returns a Boolean indicating that the port conversation digest used by the network device and the partner network device at the two ends of the same link aggregation group are the same or not. If the two digests are inconsistent, optionally a notification is sent out to notify an operator of the link aggregation group to resolve the anomaly.

If the two variables are consistent, the flow goes to block 606, where the network device determines if the conversation service mapping digest used by the network device is the same as the partner network device for the link aggregation group. The operational conversation service mapping digest of the network device may be stored in a digest such as Actor_Conversation_Service_Mapping_Digest, while the operational conversation service mapping digest of the partner device may be stored in a digest such as Partner_Conversation_Service_Mapping_Digest. The network device compares the two digests and determines if they are consistent. For example, a function such as Differ_Conversation_Service_Digests may be used, where Differ_Conversation_Service_Digests returns a Boolean indicating that the conversation service mapping digest used by the network device and the partner network device at the two ends of the same link aggregation group are the same or not. If the two digests are inconsistent, optionally a notification is sent out to notify an operator of the link aggregation group to resolve the anomaly.

Note orders of the determinations of blocks 604-606 may be different from illustrated in FIG. 6 in some embodiments of the invention. In addition, some embodiments of the invention may deploy more or less compatibility check as illustrated.

Once it is determined that the operational parameters (however, some of the parameters could be considered administrative parameters) of the network device and partner network device for the same link aggregation group are compatible and both declare long LACPDUs (may also be referred to as Version 2 LACPDUs), processing received conversation-sensitive information by long LACPDUs is possible. Each long LACPDU is over 128 octets in length. As discussed herein above, an enhanced LACPDU is needed to update conversation allocation information as a traditional LACPDU may support only up to 1024 conversations. Long LACPDUs are one embodiment of enhanced LACPDUs and other embodiments of enhanced LACPDUs are feasible in supporting the invention disclosed. Enhanced LACPDUs, in a general form, may carry control information needed to exchange conversation allocation information on links of link aggregation groups between a local network device and a partner network device. Some embodiments may not use long LACPDU, for example, when an implementation of LACP supports only no more than 1024 conversations. In other embodiment, long LACPDU is used. As each LACPDU is longer than 128 octets and it is able to support more conversations than traditional LACPDUs of 128 octets. For example, a long LACPDU may transmit a conversation mask TLV illustrated in FIG. 4A, which may indicate conversation allocation state of up to 4096 conversations. Long LACPDUs take more network resources to process and transmit, and it may not be efficient to allow their transmission at all time. Thus block 608 may set a timer to provide a time window for the network device to transmit long LACPDUs. Once the timer expires, the network device no longer transmits long LACPDUs and the process ends without updating conversation allocation. With the setting of timer for the long LACPDUs, the network device determines that operations through enhanced LACPDUs (long LACPDUs are utilized in this embodiment of the invention) are possible as described in block 303 of FIG. 3. Similar to block 305 of FIG. 3, process 600 flows to blocks 608-622 and update conversation state of an aggregation port.

Referring to FIG. 6, the network device receives one or more long LACPDUs from the partner network device indicating a different operation conversation allocation state at the partner network device at block 608. The operation conversation allocation state at the partner network device is the operational conversation mask of the partner network device as conveyed by the received long LACPDUs. A received long LACPDU may contain an operation conversation allocation state embedded within a single conversation mask TLV. In another embodiment, the operation conversation allocation state of the partner network device is embedded within multiple conversation mask TLVs such as conversation mask-1 to mask-3 as illustrated in FIGS. 12A-C.

In one embodiment, a function (such as recordReceivedConversationMaskTLV) is performed for embodiments with multiple conversation mask TLVs. The function records the parameter value for the ActPar Sync carried in a received port conversation mask-1 TLV as the current operational parameter value for the Partner_ActPar_Sync, it concatenates the value of Port_Oper_Conversation_Mask_1, Port_Oper_Conversation_Mask_2, and Port_Oper_Conversation_Mask_3 carried by the Port Conversation Mask-1 TLV, Port Conversation Mask-2 TLV, and Port Conversation Mask-3 TLV respectively, and the function records the concatenation as the current value for the partner operation mask variable. When comparing operation conversation allocation states at the partner network device and the local network device, the function compares the variable port operation conversation mask to the partner operation conversation mask at block 616.

The network device may not receive a long LACPDU, but a change of operational state of the link aggregation group of the port or a change of management configuration is detected at block 612. The network device may contain a variable for each port of an aggregation group to track a change of an operational state of each port. For example, a network device may set a ChangeActorOperDist variable for each port, and the variable is set to true when the frame distribution state changes. The variable may be expressed as ChangeAggregationPorts corresponding to the logical OR of the ChangeActorOperDist variables for all Aggregation Ports. The variable ChangeActorOperDist for each port may also track management configuration changes. For example, the variable may be set to TRUE if a new administrative value of the aggregation port selection priority list tracked by aAggConversationAdminPort[ ] (which contains administrative values of the aggregation port selection priority list for a referenced port conversation ID), or a new administrative value tracked by aAggAdminServiceConversationMap[ ] (which contains a set of service IDs), is detected. Thus also at block 612, the network device updates its operation conversation allocation state. In one embodiment, the update is through updating its operational conversation mask. In both cases, the network device updates a collection conversation mask of the port at block 616. The collection conversation mask is an operational Boolean vector in one embodiment. It may be indexed by port conversation ID, indicating whether the indexed port conversation ID is allowed to reach the Aggregator when received through an aggregation port. Then the network device checks and sees if its operational conversation mask matches the one used by the partner network device. In one embodiment, the verification is through checking Partner_Oper_Conversation_Mask variable at the network device.

In one embodiment, the network device sets a collection conversation mask of the port differently depending on whether the conversation masks of all the Aggregation Ports in the network device (including the Intra-Portal Ports (IPPs) in the case of a Portal) have been updated or not. If all the conversation Masks on all ports have been updated, the network device sets the collection conversation mask of the port to be equal to the updated port operation conversation mask (the updated port operation conversation mask may be obtained through an updating function (e.g., updateConversationMask) based on current conversation port list)). If the update of the Conversation Masks of other ports in the network device is still ongoing, the network device sets the collection conversation mask of the port to be equal to the Boolean vector corresponding to the result from the logical AND operation between the current collection conversation mask and the updated port operation conversation mask (e.g., through updateConversationMask function).

The network device indicates that the collection conversation mask and the distribution conversation mask is out of synchronization (using ActPar_Sync bit of a conversation mask state field of a conversation mask TLV as illustrated in FIG. 4B for example). As discussed herein above, the network device may contain a variable for each port of an aggregation group to track a change of an operational state of each port such as a ChangeActorOperDist variable for reach port, where the ChangeActorOperDist tracks the network device's operational port state at distributing frames. The network device will set the variable to FALSE to indicate there is no frame distribution state change.

When the operational conversation mask of the port matches the operational conversation mask of the matching port at the partner network device, the process goes to block 622, and since both network devices (partners) have the same operational conversation mask, the process of sending Long LACPUs will stop. When the operational conversation mask of the port does not match the operational conversation mask of the associated port at the partner network device, the process goes to block 617, where the out of synchronization is detected.

Then the network device sets a timer for sending an updating long LACPDU at block 618 to remote network device. It sets update local setting to TRUE when conversation mask is out of synchronization (e.g., using updateLocal to indicate that the local conversation masks need to be updated).

Embodiments of Updating Conversation Mask

Figure 7:
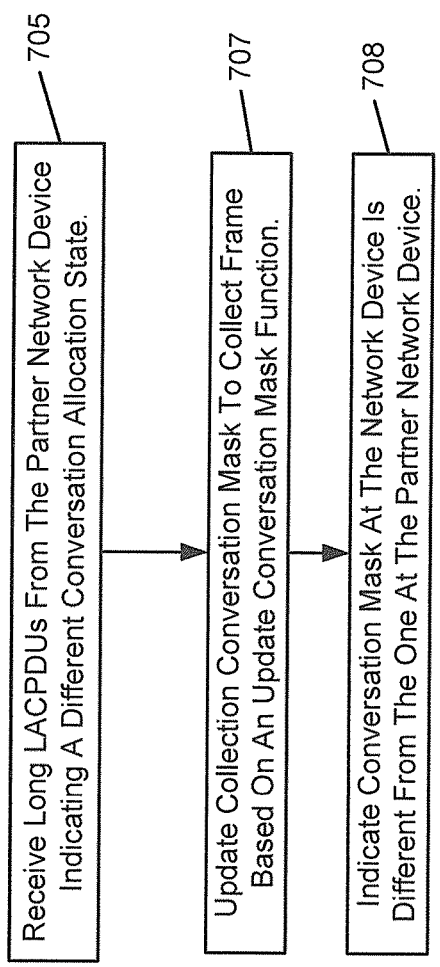
FIG. 7 is a flowchart illustrating updating a conversation mask of an aggregation port upon receiving a long LACPDU according to one embodiment of the invention.

FIG. 7 is a flowchart illustrating updating conversation mask of an aggregation port upon receiving a long LACPDU according to one embodiment of the invention. Method 700 can be implemented at an aggregation controller of a network device. At block 705 in FIG. 7, a long LACPDU is received at the network device containing a different conversation allocation state at the partner network device. When the long LACPDU contains a conversation mask of the partner network device different from the conversation mask at the aggregation port, i.e., the partner network device has sent a different conversation mask, the network device determines whether the partner network device has sent a different conversation mask by checking a partner operation conversation mask variable such as Partner_Oper_Conversation_Mask. The partner operation conversation mask variable is a variable associated with each link aggregation port. In one embodiment, the variable is stored in a storage device within the network device.

In one embodiment, a partner operation conversation mask is transmitted through a conversation mask TLV as illustrated in FIG. 4A. When a new conversation mask TLV is received, the partner operation conversation mask embedded in the new conversation mask TLV updates the partner operation conversation mask variable for the aggregation port. Thus, the partner operation conversation mask variable for the link aggregation port synchronizes with the conversation mask operating at the partner network device for the port of the link aggregation group. The network device compares the partner operation conversation mask variable with port operation conversation mask and a difference triggers block 616.

Referring to FIG. 7, at block 707, the collection conversation mask of the aggregation port is updated based on an update conversation mask function (e.g., the updateConversationMask function).

At block 708, the network device sets an indication that the conversation mask used at the network device is different from the one used at the partner network device In one embodiment, a conversation mask state value (such as ActPar_Sync bit at reference 410 of FIG. 4B) is set to indicate the discrepancy.

Although FIG. 7 illustrates an order of operations, the order of operations may be different in other embodiments of the invention, for example, blocks 707-708 may be ordered differently in another embodiment of the invention.

Note that while aggregation ports are used in discussion in relate to FIG. 7, method 700 can be implemented for portals of a distributed resilient network interconnect (DRNI) system, of which network devices also implement aggregation ports as shown in FIG. 1B.

FIGS. 8A-D illustrate a sequence of updating a conversation mask of an aggregation port according to one embodiment of the invention. Each figure includes values of partner conversation mask variable associated with an aggregation port, and also collection mask, distribution mask, and conversation mask state associated with the aggregation port. In FIG. 8A, the aggregation port operates in a normal state. The collection conversation mask and distribution conversation mask are the same, both are 01010101 . . . 00. In this example, the link aggregation group supports up to 4096 conversations, thus the collection conversation mask and distribution conversation mask contain 4096 bits (512 octets). For simplicity of illustration, only first 10 bits and last two bits of the masks are illustrated, thus the discussion focuses on conversations 0 to 9 (conversation IDs: 0 to 9), and conversations 4094 and 4095 (conversation IDs: 4094 and 4095). As illustrated, the aggregation port processes conversations 1, 3, 5, and 7. The port distributes and collects frames for the same conversations 1, 3, 5, and 7. The partner conversation mask variable is identical with the collection conversation mask and distribution conversation mask and it indicates matching port of the link aggregation group at the remote network device transmits conversations 1, 3, 5 and 7. Thus, the conversation mask state indicates that the collection conversation mask and distribution conversation mask are the same as partner conversation mask variable by setting an ActPar_Sync bit to be one, thus the conversation mask state is 10000000.

In FIG. 8B, an anomaly occurs to the link aggregation group, and the partner conversation mask variable is updated to a different value. The triggering event may be a link failure, a link aggregation system failure of a portal, or some other events. The anomaly may trigger a transmission of one or more enhanced LACPDUs such as long LACPDUs, and the enhanced LACPDUs are received at the network device. The embedded TLV (such as conversation mask TLV 400 illustrated in FIG. 4A) is used to update partner conversation mask variable associated with the aggregation port. A changed bit value of the partner conversation mask variable is highlighted by an underline, and the same notation applies to FIGS. 8C-D. The partner conversation mask variable now indicates that the partner network device transmits conversations 0-3 to the aggregation port. It no longer transmits conversations 5 and 7 but has added conversation 0 and 2.

The network device then stores the partner conversation mask variable, and keeps the aggregation port collection and distribution of frames for conversations 1, 3, 5, and 7, as before. As the conversation masks used by the local network device (actor) are different to those of the remote system (partner) the conversation mask state, represented by the ActPar_Sync bit, is reset to zero and a variable, updateLocal, is set to 1 to indicate that the local conversation mask needs to be recalculated.

In FIG. 8C, a long LACPDU has arrived, and if all the ports on the local network device have not been updated to match the same conditions as the Partner, the collection conversation mask and the distribution conversation mask is updated through a logical AND operation between the current collection conversation mask and the updated port operation conversation mask (e.g., through the update operation such as executing updateConversationMask function). Thus, the collection conversation mask and the distribution conversation mask are updated to be 01010000 . . . 00 (i.e., the aggregation port collects only frames from common conversations, 1, 3). Then in FIG. 8D, all the ports on the local network device have been updated to match the same condition as the partner and correspondingly being reported having the same Actor_Oper_Port_State.Distributing value if the connected ports on the remote Partner are down, it sets the ActPar_Sync bit to be one, indicating that the partner port at the partner network device has completed synchronization of collection conversation mask and distribution conversation mask. Then the collection conversation mask can be set to be the same as the distribution conversation mask, and collects frames for conversation 0-3 only, following the partner conversation mask variable.

Figure 9:
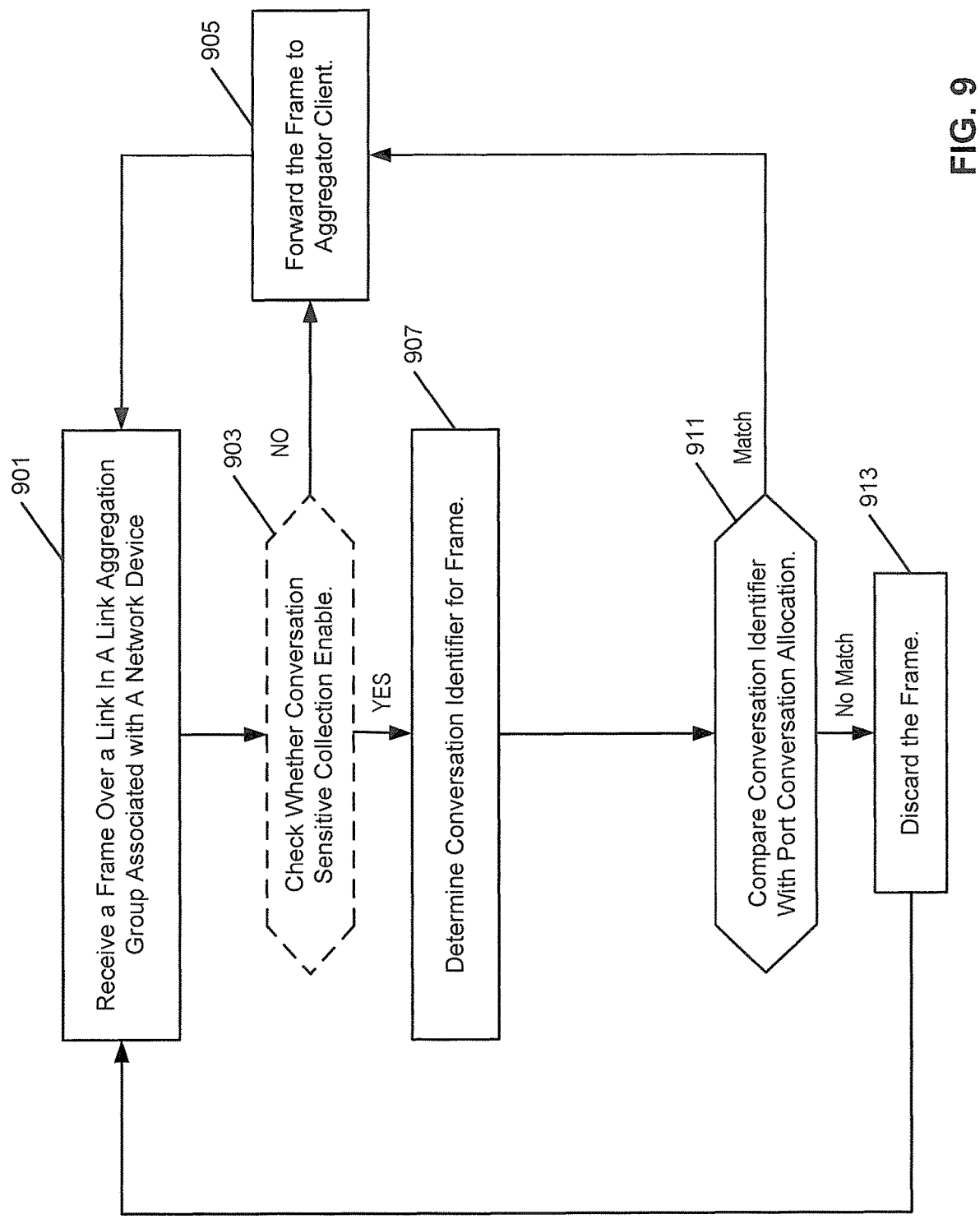
FIG. 9 is a flowchart of one embodiment of a process for conversation-sensitive collection for a Link Aggregation Group.

FIG. 9 is a flowchart of one embodiment of a process for conversation-sensitive collection for a Link Aggregation Group. The illustrated process is implemented in conjunction with the frame collection process. That is, this process relates to the handling of frames containing regular data traffic as opposed to the handling of LACPDUs as discussed herein above. Also, as described herein above, the frame collection process receives the frames from the aggregation ports and collects them based on the port algorithm utilized in conjunction with the frame distributor of the Partner system. In cases where conversation-sensitive collection and distribution is enabled, the illustrated process enforces the conversation allocation for each aggregation port. Conversations are allocated to specific ports such that frames of a given conversation that arrive on a non-allocated aggregation port are out of order as the result of conversation re-allocation to another aggregation port or similar issue.

The process can be initiated in response to receiving a frame over a link in a Link Aggregation Group associated with the network device executing the process (block 901). The network device communicating over the Link Aggregation Group can be part of a DRNI Portal or similar network configuration. The frame that is received can be any type of communication format such as an Ethernet frame or similar communication unit. The frame can be received via the Aggregation Port and passed to the frame collector of the network device. In one embodiment, the conversation-sensitive frame collection can be enabled and disabled by administrative functions or configuration. In other embodiments, the conversation-sensitive frame collection is always implemented. Where the conversation-sensitive frame collection is configurable, the frame collector can check whether the conversation-sensitive frame collection is currently enabled (block 903). If the conversation-sensitive frame collection is not enabled, the received frame is forwarded to the Aggregator Client (block 905). The frame collector organizes the received frames from all of the Aggregator Ports according to the aggregation algorithm or distribution process employed by the Partner system.

Where the conversation-sensitive collection is enabled, the conversation identifier can be determined for the received frame (Block 907). The conversation identifier can be determined using any process or technique that utilizes the information within the received frame such that the same process or technique is utilized by both the frame distributor and the frame collector to obtain the same conversation identifier deterministically. In one example implementation, the service identifier is extracted from the received frame. The service identifier can be any field or combination of fields in the received frame such as a virtual local area network (VLAN) identifier (VID) field or a backbone service instance identifier (I-SID). The service identifier can then be translated to a conversation identifier. The translation can use any local data structure such as a lookup table, mapping array or similar data structure to map service identifiers and conversation identifiers.

The resulted conversation identifier can then be compared to a conversation mask or similar data structure that tracks the conversations that have been allocated to a particular Aggregation Port (block 911). Where a match is found, the received frame is part of a conversation that has been allocated to the Aggregation Port over which it was received and thus in proper order and the frame collector can pass the frame to the Aggregator Client. However, if a match is not found in the conversation mask or similar tracking structure, then the received frame has been received out of order on the wrong Aggregation Port and is then discarded (block 913).

Figure 10:
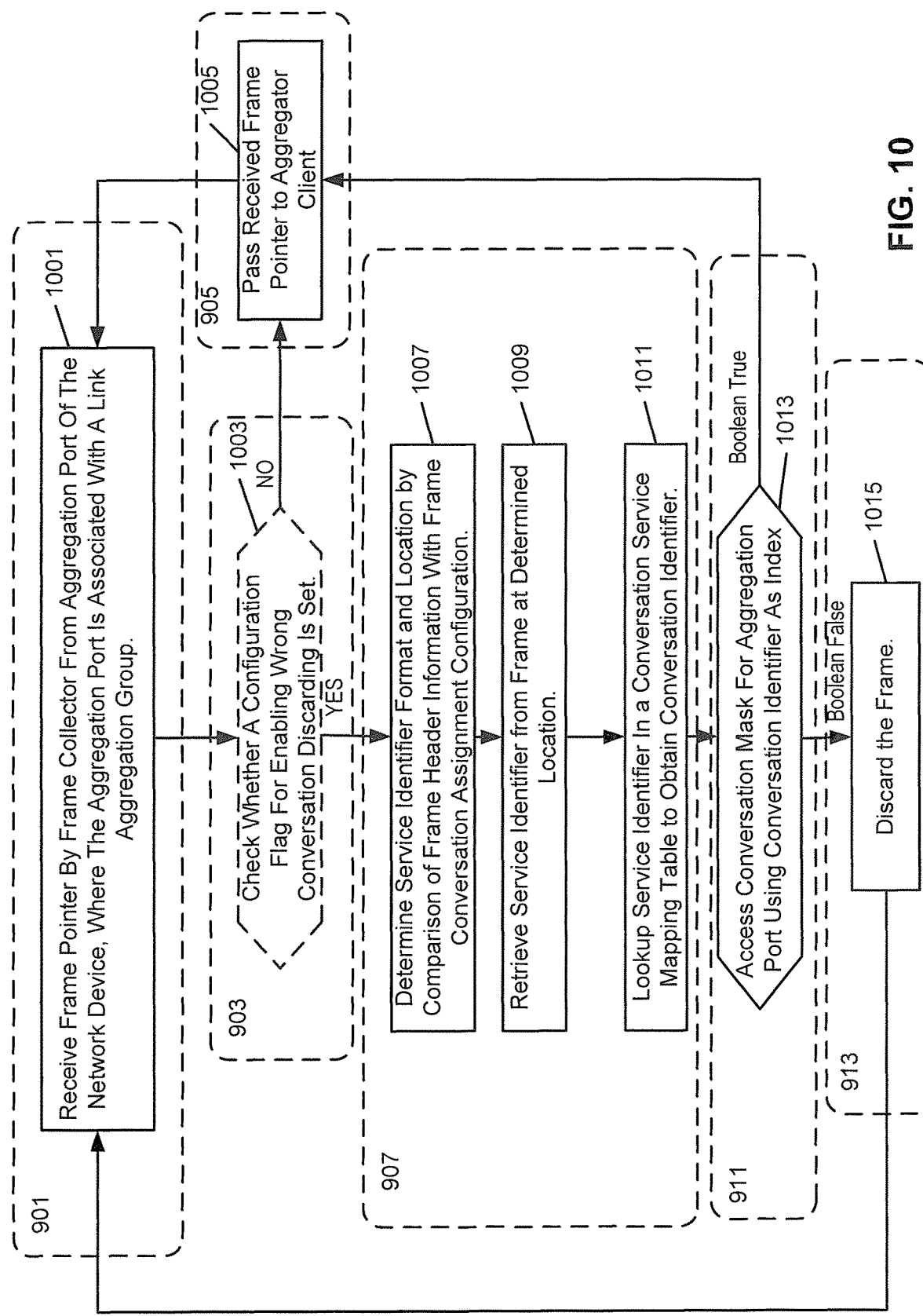
FIG. 10 is a flowchart of another embodiment of a process for conversation-sensitive collection for the Link Aggregation Group.

FIG. 10 is a flowchart of another embodiment of a process for conversation-sensitive collection for the Link Aggregation Group. This embodiment provides an example implementation of the process described above with regard to FIG. 9. The initialization in response to receiving a frame (block 901), can be the receipt of a frame pointer or identifier from a MAC Aggregation Port of the network device, where the Aggregation Port is associated with a Link Aggregation Group (block 1001). The Link Aggregation Group can be defined between two Partner systems that are Aggregations Systems and DRNI Portals. The frame can be stored in any memory device, buffer, cache, register or similar storage location in the network processor or within the network device. A pointer or similar identifier can provide the location information for accessing the frame.

The frame that is received can be any type of communication format such as an Ethernet frame or similar communication unit. The frame can be received via the Aggregation Port and passed to frame collector of the network device via control parser/multiplexers and aggregator parser/multiplexors where the frame collector is a subcomponent of an Aggregator of a Link Aggregation Sublayer executed by a network processor of the network device. In one embodiment, the conversation-sensitive frame collection can be enabled and disabled by administrative functions or configuration. In other embodiments, the conversation-sensitive frame collection is always implemented. Where the conversation-sensitive frame collection is configurable, the frame collector can check whether the conversation-sensitive frame collection is currently enabled (block 903) by checking whether a flag or similar status marker (e.g., an 'Enabling Wrong Conversation Discarding' flag) is set in a configuration of the Aggregator or similar location (block 1003). If the conversation-sensitive frame collection is not enabled, the received frame, frame pointer or similar frame identifier is forwarded to the Aggregator Client (block 905, 1005). The frame collector collects the received frames from all of the Aggregator Ports according to the aggregation algorithm or distribution process employed by the Partner system.

The frame can be processed to determine an associated conversation identifier by any function that uses a shared deterministic process between the frame collector and the frame distributor (e.g., a DeterminePortConversationID function) (Block 907). In one example embodiment, such a function can determine the conversation identifier by accessing the frame to extract a Service ID (block 907), where the frame content and format is first examined to determine a Service ID format and location by comparing the frame header information with frame conversation assignment configuration information (block 1007). The frame format and the configuration information can indicate that the Service ID is in the form of a 12-bit VID field, a 24-bit I-SID field or similar fields or combinations thereof depending on the frame format. The configuration can designate any field or set of fields to be utilized as the Service ID of received frames. The process then continues by using the Service ID type and location information to retrieve the Service ID from the frame (block 1009). For example, a frame pointer and the location information can take the form of an address and offset, respectively, enabling the frame collector to access and retrieve the value at the specified location.

The retrieved Service ID can then be used to obtain (i.e., translated to) the corresponding conversation identifier. The translation process can take the form of a lookup using a Conversation Service Mapping Table (i.e., the aAggAdminServiceConversationMap[ ] array, which uses a conversation identifier as an index and stores Service IDs). The lookup can use the Service ID as an index, can traverse a data structure to match the Service ID or perform a similar lookup operation on the Conversation Service MappingTable. The lookup operation returns the corresponding conversation identifier for the received frame.

A check can then be made whether the received frame has a conversation identifier of a conversation that has been allocated to the Aggregation Port over which it was received block 911). This check can be discerned by accessing a conversation mask for the Aggregation Port through which the frame was received, where the conversation mask is a bitmap or similar data structure that is used to track the conversations allocated to the Aggregation Port (block 1013). If the corresponding bit for the conversation identifier is set to a Boolean True value, then the frame is associated with a conversation that is properly allocated to the Aggregation Port and can be forwarded to the Aggregator Client (block 1005). If however, the corresponding bit in the conversation mask is set to a Boolean False, then the frame is discarded (block 913, 1015), because the frame is associated with a conversation that is not allocated to the Aggregation Port through which it was received, indicating that it was sent in error or out of order due to reallocation processes or similar changes.

Figure 11:
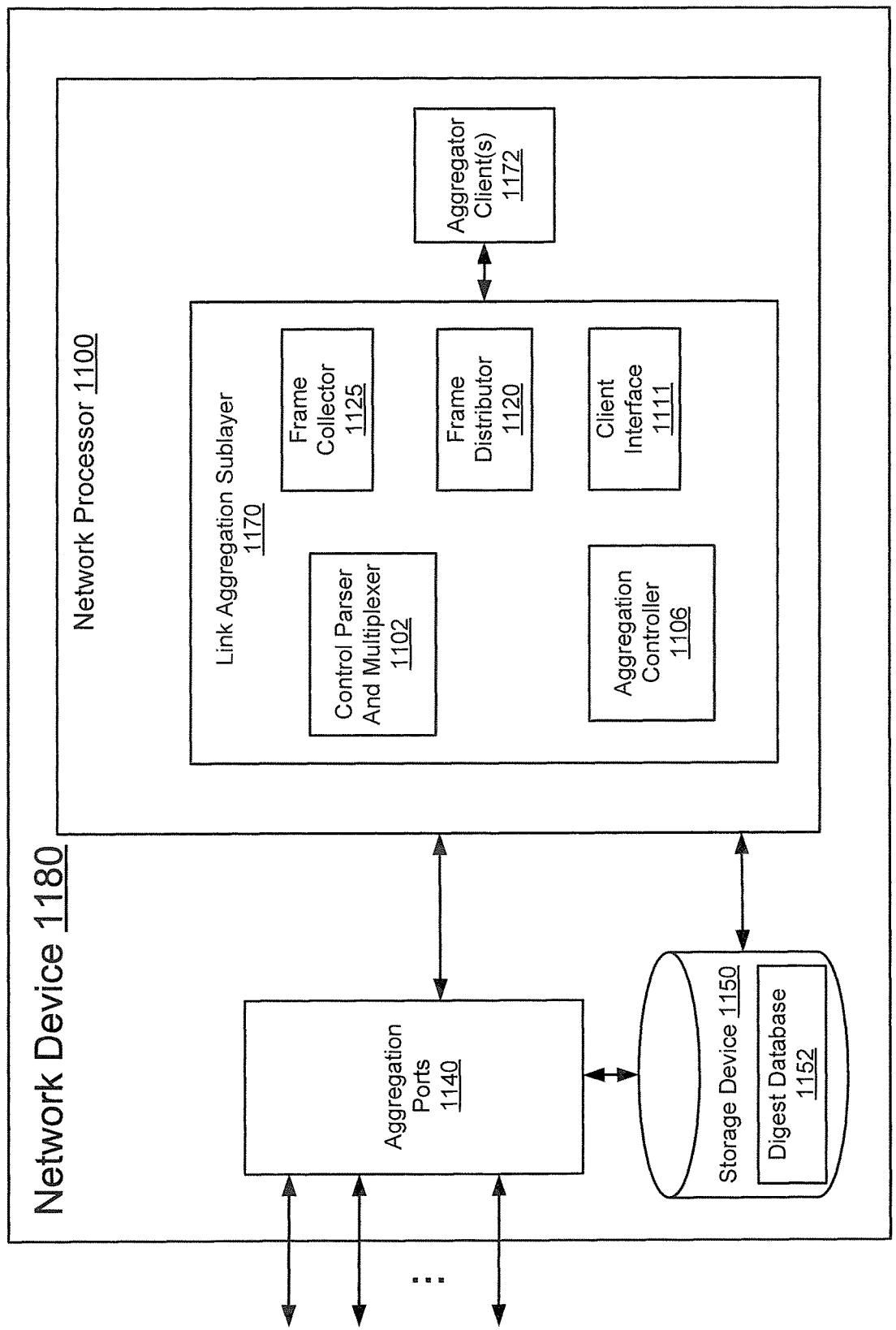
FIG. 11 is a diagram of one embodiment of a network device implementing conversation-sensitive collection for the Link Aggregation Group.

FIG. 11 is a diagram of one embodiment of a network device implementing conversation-sensitive collection for the Link Aggregation Group in a network. The network device may process conversations wherein each conversation is for a service or an application in the network. The network device 1180 can implement a link aggregation sublayer 1170 as described herein above in regard to FIG. 2 and supports the link aggregation functions described herein above. The network device 1180 can include a network processor 1100, a set of ports 1140, a storage device 1150 and similar network device components. The components of the network device are provided by way of example and not limitation. The network device 1180 can implement the aggregation functions and the link aggregation sublayer 1170 using any number or type of processors and with any configuration. In other embodiments, the aggregation functions and link aggregation sublayer and related components are distributed over a set of network processors, a set of line cards and their constituent general purpose and application specific processor or similar implemented in a network device architecture.

The ports 1140 can connect the network device via a physical medium such as Ethernet, fiber optic, or similar medium with any number of other network devices. Any number and variety of ports can be present in the network device 1180. Any combination or subset of the ports 1140 can be organized and managed as a Link Aggregation Group or a DRNI Portal where the network device functions as an Aggregation System.

A set of storage devices 1150 within the network device 1180 can be any type of memory devices, caches, registers or similar storage devices for use as working memory and or persistent storage. Any number and variety of storage devices 1150 can be utilized to store the data of the network device including programmed data and received data traffic to be processed by the network device 1180. In one embodiment, a digest database 1152 or similar organization of the conversation service mapping digest, conversation masks, conversation allocation states of lists of conversations transmitting through the aggregation port, and similar data structures described herein above can be stored in such a data structure. Other data structures stored in the storage device 1150 can include the aAggAdminServiceConversationMap[ ] and similar data structures. In other embodiments, these data structures can be conceived as being independent and can be distributed over any number of separate storage devices 1150 within the network device 1180.

A set of network processors 1100 can implement the aggregation functions and the link aggregation sublayer 1170 described herein above. The aggregation functions can include aggregator client(s) 1172 and the link aggregation sublayer 1170, which can include control parser/multiplexer 1102, aggregation controller 1106, frame collector 1125, frame distributor 1120, and client interface 1111. As described further herein above, the aggregator client(s) 1172 can provide higher level functions of the network device such as Layer 3 functions and similar higher level functions.

The aggregation controller 1106 as described further herein above, can implement link aggregation control and the link aggregation control protocol functions. These functions manage the configuration and allocation of link aggregation groups, the DRNI portal and similar aspects. The control parser and multiplexer 1102 identifies and forwards LACPDUs from the other data traffic received on the aggregation ports and sends the LACPDUs to the aggregation controller 1106 and other data traffic to the link aggregation sublayer 1170.

The link aggregation sublayer 1170 as described further herein above, manages the collection and distribution of the frames according to the distribution algorithm. Within the link aggregation sublayer 1170, frame collector 1125 receives the frames and organizes them according to the distribution algorithm shared with the partner system across the link aggregation group. A frame distributor 1120 prepares and selects the outbound frames for transmission over a set of aggregation ports according to the distribution algorithm. A client interface 1111 receives and transmits frames to and from the aggregator client(s) 1172. Inbound frames are passed from the frame collector 1125 to the aggregator client(s) 1172 and outbound frames are passed from the frame distributor 1120 to the aggregator client(s) 1172.

As discussed herein above with regard to conversation-sensitive collection for a Link Aggregation Group, the frame collector 1125 is configured to determine a conversation identifier for a received frame (e.g., using a DetermineConversationID function that in one example embodiment extracts a service identifier from the frame and translates the service identifier to the conversation identifier, however, any deterministic process can be utilized that is shared between the frame collector and frame distributor), compare the conversation identifier with port conversation allocation, discard the frame in response to a non-match of the conversation identifier with the port conversation allocation, and forward the frame to an aggregator client in response to a match of the conversation identifier with the port conversation allocation. In addition, in one example embodiment, the frame collector 1125 can check whether conversation-sensitive collection is enabled, can receive a frame pointer from an aggregation port that is associated with the link aggregation group, can extract the service identifier from the frame by determining a service identifier format and location by comparison of frame header information with frame conversation assignment configuration, and retrieving the service identifier from the frame at the determined location, can translate the service identifier to the conversation identifier by looking up a service identifier in a conversation service mapping digest to obtain the conversation identifier, can compare the conversation identifier with port conversation allocation by accessing a conversation mask for the aggregation port using the conversation identifier as an index, and can discard the frame in response to finding a Boolean false at a location in the conversation mask identified by using the conversation identifier as the index.

In one embodiment, aggregation controller 1106 verifies that an implementation of a conversation-sensitive link aggregation control protocol (LACP) is operational. The verification is performed through aggregation controller 1106 initializing the implementation of a LACP and then receiving at least one of (1) an identifier of an algorithm used to assign frames to port conversation identifiers at a partner network device; (2) a conversation identifier digest from the partner network device; and (3) a conversation service mapping digest from the partner network device. The received parameters can be stored in storage device 1150 (e.g., digest database 1152).

Then aggregation controller 1106 determines whether operations through enhanced LACPDUs are possible after verifying that the implementation of a LACP is operational. As discussed herein above, the enhanced LACPDUs can be used for updating conversation allocation information, and the determination is based on a compatibility check between a set of operational parameters of network device 1180 and another matching set of operational parameters of a partner network device of network device 1180. The partner network device is a remote network device of the other end of a link aggregation group of network device 1180. In one embodiment, the enhanced LACPDUs are long LACPDUs, which means they are more than 128 octets in length.

In one embodiment, the compatibility check includes (1) determining that a first algorithm used to assign frames to port conversation identifiers at the network device is consistent with a second algorithm used to assign frames to port conversation identifiers received from the partner network device, (2) determining that a first conversation identifier digest of the network device is consistent with a second conversation identifier digest received from the partner network device, and (3) determining that a first conversation service mapping digest is consistent with a second conversation service mapping digest received from the partner network device. If the compatibility check passes, aggregation controller 1106 processes the received collection-sensitive information and sets a timer to provide a time window to transmit enhanced LACPDUs. If the timer expires and no enhanced LACPDU has been received, then the default configuration parameters for the partner are set and another verification/compatibility check cycle needs to be initiated.

If the compatibility check fails, the enhanced LACPDUs cannot be used and manual intervention may be required, thus aggregation controller 1106 optionally may send out a notification to indicate that failure of compatibility check.

When the compatibility check passes, aggregation controller 1106 can be configured to update a conversation allocation state of an aggregation port of the link aggregation group based on a determination that the conversation allocation state is incorrect. In one embodiment, the conversation allocation state of an aggregation port is represented by a conversation mask of the aggregation port. The conversation mask of the aggregation port can be represented by a conversation mask Type/Length/Value (TLV), which contains (1) a TLV type field, (2) a conversation mask length field; (3) a conversation mask state field, and (4) a port operation conversation mask field. The structure of each field has been discussed herein above. Note the conversation mask may be represented by one or more conversation mask TLVs as illustrated in FIGS. 4A-C and 12A-C and discussed herein above.

Updating the conversation allocation state may be based on a determination that the first conversation allocation state of the aggregation port of the link aggregation group at the network device is different from a second conversation allocation state of the aggregation port received from the partner network device, where the second conversation allocation state indicates a second list of conversations received through the link aggregation group. Alternatively, updating the conversation allocation state may be based on a detection of a change of operational state of a neighboring aggregation port of the aggregation group at the network device. Note the network device may set a timer to provide a time window for the network device to transmit long LACPDUs. Once the timer expires, the network device is prohibited from transmitting enhanced LACPDUs (e.g., long LACPDUs as discussed herein above) and the process of updating conversation allocation ends. With the setting of timer for the long LACPDUs, the network device first determines that operations using enhanced LACPDUs are possible as described in block 303 of FIG. 3.

Some terms have been changed between the present document and the priority documents for sake of clarity. However, all changes in terms have been with regard to equivalent terminology. A 'data flow' as used herein and the priority documents is understood to refer to an ordered sequence of frames, which is also equivalent to a 'conversation.' Reference has been made to a link aggregation group 'level,' which introduces a dichotomy between the 'link level' and the link aggregation group 'level' and stating that a conversation identifier identifies a conversation at a link aggregation group level is equivalent to indicating that the conversation identifier identifies the conversation at a given link aggregation group. Where 'each frame' of a set of frames received at a network device was recited, a particular 'received frame' is within this set of frames.

While the invention has been described in terms of several example embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a network device for implementing conversation-sensitive collection for frames received on a port of a link of a link aggregation group, where a conversation consists of an ordered sequence of frames, the method comprising:
   receiving a frame over the link of the link aggregation group at the network device, wherein each frame includes a service identifier and is associated with a conversation identifier;
   determining the conversation identifier for the frame using the service identifier of the frame;
   comparing the conversation identifier with port conversation allocation for the port of the link aggregation group;
   discarding at a link aggregation sublayer the frame in response to a non-match of the conversation identifier with the port conversation allocation to maintain the ordered sequence of frames in the conversation; and
   forwarding the frame to an aggregator client in response to a match of the conversation identifier with the port conversation allocation.

2. The method of claim 1, further comprising the step of:
   checking whether conversation-sensitive collection is enabled.

3. The method of claim 1, wherein receiving the frame over the link of the link aggregation group further comprises:
   receiving a frame pointer by a frame collector from an aggregation port that is associated with the link aggregation group.

4. The method of claim 1, wherein determining the conversation identifier for the frame further comprises:
   determining a service identifier format and location by comparison of frame header information with frame conversation assignment configuration; and retrieving the service identifier from the frame at the determined location.

5. The method of claim 1, wherein determining the conversation identifier further comprises:
   looking up the service identifier in a conversation service mapping table to obtain the conversation identifier.

6. The method of claim 3, wherein comparing the conversation identifier with port conversation allocation further comprises:

accessing a conversation mask for the aggregation port using the conversation identifier as an index.

7. The method of claim 6, wherein the discarding of the frame is executed in response to finding a Boolean false at a location in the conversation mask identified by using the conversation identifier as the index.

8. The method of claim 1, wherein the service identifier identifies the conversation at a link level for the service, and the conversation identifier identifies the conversation at a link aggregation group level.

9. The method of claim 6, further wherein the conversation mask matches an operational conversation mask of an associated port at a partner network device that sent the frame on the link.

10. A network device configured to implement conversation-sensitive collection for frames received on a port of a link of a link aggregation group, where the conversation consists of an ordered sequence of frames, the network device comprising:
  a set of aggregation ports configured to receive a frame over the link of the link aggregation group, wherein each frame includes a service identifier and is associated with a conversation identifier; and
  a network processor coupled to the set of aggregation ports, the network processor configured to execute a link aggregation sublayer including a frame collector, the frame collector configured to determine a conversation identifier of the frame using the service identifier, to compare the conversation identifier with port conversation allocation for the port of the link aggregation group, to discard the frame in response to a non-match of the conversation identifier with the port conversation allocation to maintain the ordered sequence of frames in the conversation, and to forward the frame to an aggregator client in response to a match of the conversation identifier with the port conversation allocation.

11. The network device of claim 10, wherein the frame collector is further configured to check whether conversation-sensitive collection is enabled.

12. The network device of claim 10, wherein the frame collector is further configured to receive a frame pointer from an aggregation port that is associated with the link aggregation group.

13. The network device of claim 10, wherein the frame collector is further configured to determine the conversation identifier by determining a service identifier format and location by comparison of frame header information with frame conversation assignment configuration, and retrieving the service identifier from the frame at the determined location.

14. The network device of claim 10, wherein the frame collector is further configured to determine the conversation identifier by looking up the service identifier in a conversation service mapping table to obtain the conversation identifier, the network device further comprising:
  a storage device to store the conversation service mapping table and the received conversation service mapping digests.

15. The network device of claim 12, wherein the frame collector is further configured to compare the conversation identifier with port conversation allocation by accessing a conversation mask for the aggregation port using the conversation identifier as an index.

16. The network device of claim 15, wherein the frame collector is further configured to discard the frame in response to finding a Boolean false at a location in the conversation mask identified by using the conversation identifier as the index.

17. The network device of claim 10, wherein the service identifier identifies the conversation at a link level for the service, and the conversation identifier identifies the conversation at a link aggregation group level.

18. The network device of claim 15, further wherein the conversation mask matches an operational conversation mask of an associated port at a partner network device that sent the frame on the link.

19. A non-transitory computer-readable storage medium having instructions stored therein which when executed by a processor, causes the processor to perform operations for implementing conversation-sensitive collection for frames received on a port of a link of a link aggregation group, where the conversation consists of an ordered sequence of frames, the operations comprising:
  receiving a frame over the link of the link aggregation group at the network device, wherein each frame includes a service identifier and is associated with a conversation identifier;
  determining the conversation identifier for the frame using the service identifier of the frame;
  comparing the conversation identifier with port conversation allocation for the port of the link aggregation group;
  discarding at a link aggregation sublayer the frame in response to a non-match of the conversation identifier with the port conversation allocation to maintain the ordered sequence of frames in the conversation; and
  forwarding the frame to an aggregator client in response to a match of the conversation identifier with the port conversation allocation.

20. The non-transitory computer-readable medium of claim 19, wherein the service identifier identifies the conversation at a link level for the service, and the conversation identifier identifies the conversation at a link aggregation group level.

* * * * *